United States Patent
Ogino et al.

(10) Patent No.: US 6,253,020 B1
(45) Date of Patent: Jun. 26, 2001

(54) VIDEO SIGNAL TRANSMISSION METHOD SUPERIMPOSED INFORMATION TRANSMISSION METHOD VIDEO SIGNAL OUTPUT DEVICE VIDEO SIGNAL RECEPTION DEVICE AND VIDEO SIGNAL RECORDING MEDIUM

(75) Inventors: Akira Ogino, Chiba; Nozomu Ikeda, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/007,702

(22) Filed: Jan. 15, 1998

(30) Foreign Application Priority Data

Jan. 22, 1997 (JP) .................................................. 9-009439

(51) Int. Cl.[7] .............................. H04N 5/76; H04N 5/92
(52) U.S. Cl. ................................ 386/94; 386/95; 360/60; 380/203
(58) Field of Search ............................... 386/1, 94, 95; 360/15, 60; 380/201, 203, 210; 375/200–204, 206–210; 348/473, 476, 478; H04N 5/76, 5/92, 9/79

(56) References Cited

U.S. PATENT DOCUMENTS

| | | |
|---|---|---|
| 3,984,624 | 10/1976 | Waggener . |
| 5,982,977 * | 11/1999 | Naruse et al. ........................... 386/94 |
| 6,023,551 * | 2/2000 | Sugita et al. ............................ 386/94 |
| 6,058,243 * | 5/2000 | Ogino et al. ........................... 386/94 |
| 6,069,665 * | 5/2000 | Ikeda et al. ............................ 348/478 |
| 6,112,008 * | 8/2000 | Sugita et al. ............................ 386/94 |
| 6,163,565 * | 12/2000 | Moriwaki et al. .................... 375/141 |

FOREIGN PATENT DOCUMENTS

| | | |
|---|---|---|
| 0360615 | 3/1990 | (EP) . |
| 0400906 | 12/1990 | (EP) . |
| 0574892 | 12/1993 | (EP) . |
| 0778566 | 6/1997 | (EP) . |

* cited by examiner

*Primary Examiner*—Thai Tran
(74) *Attorney, Agent, or Firm*—Jay H. Maioli

(57) ABSTRACT

A spread code string containing a plurality of chips per interval in one horizontal interval or containing a plurality of chips per interval in one vertical interval is generated synchronously with the vertical sync signal at the generation star timing having a period of one vertical period or having a period of a plurality of vertical periods. The generated spread code string repeats over a plurality of horizontal intervals or a plurality of vertical intervals so that the chips having the same data are arranged in spatial direction of the vertical direction or the time axis direction in picture unit. The additional information is spectrally spread so that the chips having the same data are arranged at least in the interval in each 1 horizontal interval or in each 1 vertical interval of the above-mentioned repetition interval, and the generated spectral spread signal is superimposed on the video signal. Thereby, the additional information spectrally spread and superimposed on a video signal is prevented from being removed and being deteriorated, and the quantity of additional information to be superimposed on the video signal is increased.

23 Claims, 19 Drawing Sheets

ANTI-DUPLICATION CONTROL SIGNAL
SPECTRUM BEFORE SPECTRAL SPREAD

ANTI-DUPLICATION CONTROL SIGNAL
SPECTRUM AFTER SPECTRAL SPREAD

SPECTRUM OF INFORMATION SIGNAL ON WHICH SS ANTI-DUPLICATION CONTROL SIGNAL IS SUPERIMPOSED

SIGNAL SPECTRUM AFTER SPECTRAL INVERSION SPREAD IN RECORDING DEVICE SIDE

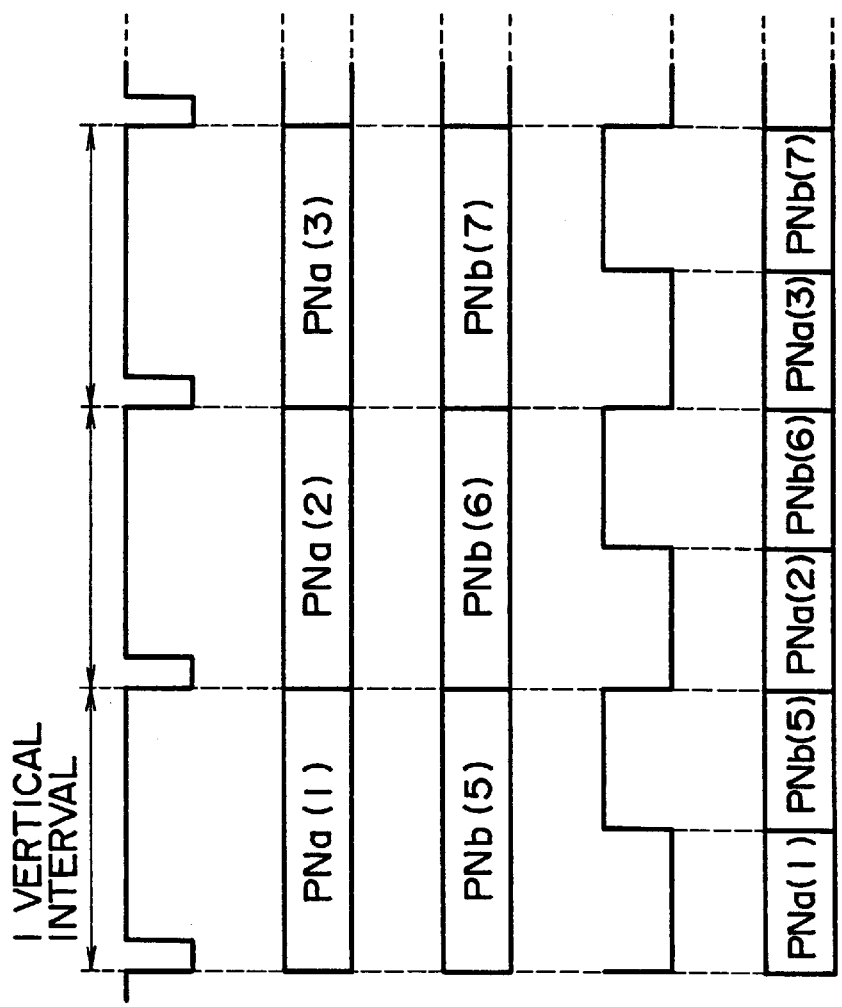

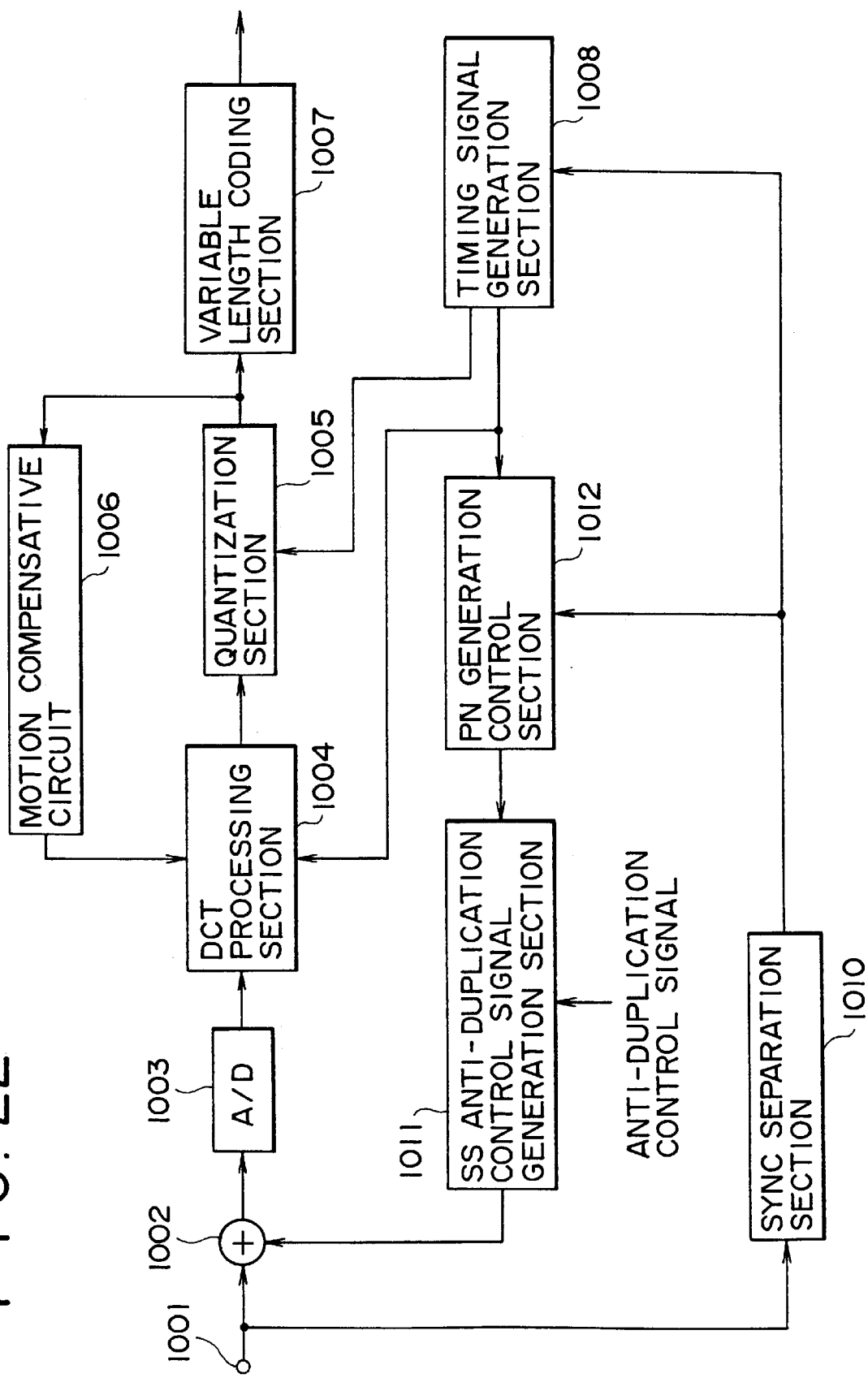

VIDEO SIGNAL TRANSMISSION METHOD SUPERIMPOSED INFORMATION TRANSMISSION METHOD VIDEO SIGNAL OUTPUT DEVICE VIDEO SIGNAL RECEPTION DEVICE AND VIDEO SIGNAL RECORDING MEDIUM

BACKGROUND OF THE INVENTION

1. Field of the Invention

This invention relates to a method, device, and video signal recording medium which is capable of performing a method that outputs a video signal having an additional information superimposed thereon, receives and extracts the received additional information, and performs duplication prevention control using the extracted additional information, for example, as in the case that a video signal recorded in a recording medium is played back, the video signal is transmitted together with an information for preventing duplication, the transmitted video signal is received, and recording on another recording medium is restricted or inhibited.

2. Description of Related Art

VTR (Video Tape recording devices) has been popularized in daily life, and many kinds of software which can be played back on a VTR are supplied abundantly. Digital VTR or DVD (Digital Video Disks) playback devices have been available commercially now, and provide images and sound of exceptionally high quality.

On the other hand, there is, however, a problem in that software applications of this great abundance can be copied without restriction, and several methods have already been proposed to inhibit duplication.

For example, though the method is a method which inhibits duplication of an analog video signal not directly, one method to prevent copying uses a difference in the AGC (Automatic Gain Control) system, or in the APC (Automatic Phase Control) system, for example, between the VTR recording device and a monitor receiver for displaying the image.

For example, the method which utilizes the difference in AGC system, in which a VTR performs AGC using a pseudo sync signal inserted in the video signal and a monitor receiver employs a different AGC system not using the pseudo sync signal, is an example of the former. In detail, when an analog video signal is recorded in an original recording medium, a very high level pseudo sync signal is previously inserted as a sync signal for AGC, and the very high level pseudo sync signal is inserted in the video signal to be supplied from a playback VTR to a recording VTR as a sync signal for AGC.

Alternately, the method which utilizes the difference of APC characteristics between a VTR and receiver as in the case that APC in a VTR can follow the color burst signal in a video signal with a short time constant but APC in a receiver follows with a relatively long time constant is an example of the latter. In detail, the phase of the color burst signal of a video signal is previously inverted partially when the analog video signal is recorded in an original recording medium, and the color burst signal having partially inverted phase is output as a video signal to be supplied from a playback VTR to a recording VTR.

As the result, the monitor receiver which receives the analog video signal from the playback VTR plays back the image correctly without being affected by the pseudo sync signal in AGC or without undesirable effects of the partial phase inversion of the color burst signal used for APC.

On the other hand, in a VTR, which is supplied with the analog video signal from the playback VTR into which pseudo sync signals have been inserted or which has been subjected to color burst signal phase inversion control as described herein above, for receiving such analog video signal and for recording the analog video signal in a recording medium, proper gain control or phase control based on the input signal cannot be performed, and so the video signal is not correctly recorded. Even if this signal is played back, therefore, normal picture and sound cannot be obtained.

As described herein above, in the case that involves an analog video signal, the method does not directly inhibit duplication but is a method for causing abnormally played back picture which can not be viewed normally. Such prevention method is a passive duplication prevention control.

On the other hand, in the case that a digitized information, for example, a video signal is involved, an anti-duplication signal or an anti-duplication control signal comprising, for example, a duplication ranking control code, is added as digital data to the video signal and recorded on the recording medium, so as to prevent or control duplication of the image.

FIG. 1 is a basic structural diagram of a duplication apparatus for duplicating digitized information, a digital information played back by the digital playback device 110 is sent to a digital recording device 120 through a digital transmission line 101, and the digital recording device 110 duplicates the digital information if duplication is permitted and does not duplicate the digital information if duplication is not permitted.

An anti-duplication control information in the form of additional information is recorded in a recording medium 111 placed on the digital playback device 110 in addition to a digital main information. The anti-duplication control information indicates control content such as duplication inhibition, duplication permission, or generation restriction. The digital playback section 112 reads out the information from the recording medium 111, acquires the anti-duplication control information together with the digital main information, and sends them to the digital recording device 120 through the digital transmission line 101.

An anti-duplication control signal detection section 122 of the digital recording device 120 detects the anti-duplication control signal out of the information received from the digital transmission line 101, and judges the control content The judgement result is sent to a digital recording section 121.

If the judgement result of the anti-duplication control signal from the anti-duplication control signal detection section 122 indicates permission of recording of the digital information input through the digital transmission line 101, then the digital recording section 121 converts the input digital signal to a digital information suitable for recording, and writes it in the recording medium 123, that is recording is performed. On the other hand, if the judgement result of the anti-duplication control signal from the anti-duplication control signal detection section 122 indicates duplication inhibition, then the digital recording section 121 does not perform recording processing of the input digital information.

Further, if the judgement result of the anti-duplication control signal from the anti-duplication control signal detection section 122 indicates permission of recording of only the first generation, then the digital recording section 121 converts the input digital signal to a digital information suitable for recording, and writes it in the recording medium 123, that is, recording is performed, and additionally, converts the anti-duplication control signal in the form of additional information to a signal for indicating duplication inhibition (duplication inhibition of next generation), and records it in the recording medium 123. Therefore, the video signal can not be duplicated further using the recording medium 123 in which the information is recorded.

As described herein above, in the case of a digital connection in which the main information signal and anti-duplication control signal added as an additional information are supplied to a recording device in the form of digital signal, because the anti-duplication control signal is contained in the digital data to be transmitted, duplication prevention control such as duplication inhibition is performed consistently in a recording device using the anti-duplication control signal.

In the case that the digital playback device in FIG. 1 is, for example, a digital VTR, in order to monitor the played back video signal and audio signal, both the video signal that is the main information signal, and the audio signal are converted to an analog signal through a D/A conversion circuit 113 and guided to an analog output terminal 114 connected usually to a monitor receiver.

As described herein above, though the playback device is a device for playing back digital signals, the anti-duplication control signal is not contained in the analog signal guided to the analog output terminal 114. Therefore, in the case of an analog connection in which an analog device such as analog VTR is connected to the analog output terminal 114, duplication of the information signal is undesirably possible.

Though it is considered that the anti-duplication control signal is superimposed and added on the D/A converted video signal and audio signal, it is difficult for the anti-duplication control signal to be added, extracted in a recording device, and used in duplication prevention control without deterioration of the D/A converted video signal and audio signal.

Therefore, heretofore in the case of analog connections only the passive duplication prevention method utilizing the difference in AGC system or the difference in APC characteristic between a VTR and monitor receiver described herein above has been an available duplication prevention control method.

However, in the case of the duplication prevention control method utilizing the difference in AGC system or APC characteristics between a VTR and monitor receiver described herein above, it can happen to record the video signal normally and to fail in even the passive duplication prevention dependently on the AGC system or APC characteristics of the recording device side. Further, it can happen to cause disturbance of played back picture on the monitor receiver. These are problems in duplication prevention control.

The inventors of the present invention has proposed previously a method in which a anti-duplication control signal is spectrally spread, the spectrally spread anti-duplication control signal is superimposed on the analog video signal, and the video signal is recorded in the form of digital record or analog record (refer to U.S. patent application Ser. No. 08/75510) as a duplication prevention control method which can solve the problem described herein above and is effective for both analog connection and digital connection without deterioration of the played back picture and sound.

According to this method, a PN (Pseudorandom Noise) sequence code (referred to hereinafter as PN code) used as spread code is generated at a sufficiently fast rate and spectrally spread by multiplying it by the anti-duplication control signal. In this way, a narrow-band high-level anti-duplication control signal is converted to a wide-band low-level signal which does not affect adversely the video signal or sound signal. This spectrally spread anti-duplication control signal is then superimposed on the analog video signal, and recorded in a recording medium. In this case, the signal to be recorded in a recording medium may be an analog signal or a digital signal.

In this method, because the anti-duplication control signal is spectrally spread and superimposed on the video signal as a wide-band low-level signal, it is therefore difficult for a person who wishes to illegally duplicate the video signal to remove the anti-duplication control signal which is superimposed on it.

However, it is possible to detect and use the superimposed anti-duplication control signal by performing inversion spectral spread. This anti-duplication control signal is therefore supplied to the recording device together with the video signal. In the recording side, the anti-duplication control signal is detected, and duplication is consistently controlled according to the detected anti-duplication control signal.

However, in the case of a system in which an anti-duplication control signal is spectrally spread and it is superimposed on the video signal, in some cases, the spectrally spread anti-duplication control signal is removed, deteriorated or changed by using the noise removal system for video signals For example, in the case of the noise removal system for removing noise in a video signal by utilizing correlation between picture elements of video signals, between frame intervals, or between fields, the difference is taken between adjacent video signals of adjacent horizontal scanning lines, adjacent fields or adjacent frames, and the difference obtained is removed as noise.

In this case, it can happen that the anti-duplication control signal spectrally spread and superimposed on the video signal is calculated as the difference, and it is removed as mentioned above. And when it is removed, it can happen that the spectrally spread anti-duplication signal is changed to a different spectrally spread anti-duplication control signal.

Further, when the noise removal system mentioned above is used, though not all anti-duplication control signals spectrally spread and superimposed on the video signal, are removed it can happen that an anti-duplication control signal superimposed on the video signal is removed partially, and an anti-duplication control signal deteriorates. In this case, a correct anti-duplication control signal superimposed on the video signal cannot be extracted, and the playback prevention control corresponding to an anti-duplication control signal is not performed.

Further, for example, in the case that a so-called horizontally-long wide television image of 16:9 aspect ratio is converted into a television image of standard 4:3 aspect ratio, or in the case that a television image is converted conversely, when picture element data are thinned out or interpolated in the horizontal direction, or a picture is enlarged or reduced in right and left direction, the anti-duplication control signal spectrally spread and superimposed on the thinned out video signal disappears, or the spectrally spread anti-duplication control signal using the interpolated data becomes discontinuous, and then it can happen that an anti-duplication control signal is impossible to be restored to the original state by spectrum reverse diffusion.

Further in the case that NTSC system is converted into PAL system, or in the case of inverse conversion, when, system conversion between different television systems having different number of scanning lines is performed, the same problem as described above can happen in this case during performing thinning out and interpolation processing in horizontal line unit.

Because the video signal of 1 field is composed again using the video signal of several fields when special speed playback such as slow playback or double speed playback is performed on a VTR, in this video signal composed again, it can happen that the spectrally spread anti-duplication control signal becomes discontinuous, and an anti-duplication control signal cannot be restored to the original state by inversion spectral spread.

In the case that so-called cut editing is performed and video signal in field unit is thinned out, in video signal after cut editing, the spectrally spread anti-duplication control signal becomes discontinuous similarly, and the anti-duplication control signal becomes impossible to be restored to the original state by way of inversion spectral spread.

The conventional spectral spread can involve only small quantity of information to be superimposed on as the additional information such as anti-duplication control signal, it is also a problem.

In view of the above-mentioned problems, it is the object of the present invention to provide a method, device, and video signal recording medium in which the above problems are eliminated, and additional information spectrally spread superimposed on the video signal is transmitted consistently to the receiver, the complete additional information can be extracted, and the quantity of additional information to be superimposed is increased.

SUMMARY OF THE INVENTION

The first video signal transmission method in accordance with the present invention is a transmission method for transmitting a spectrally spread additional information superimposed on a video signal which comprises:

- a spread code generation step for generating a spread code string containing a plurality of chips per interval in 1 horizontal interval or a plurality of chips per interval in 1 vertical interval at the generation start timing having the period of 1 vertical period or having the period of a plurality of vertical periods synchronously with the vertical sync signal,
- a spread code repetition step for repeating the spread code strings generated in the spread code generation step over a plurality of horizontal intervals or a plurality of vertical intervals so that chips having the same data are arranged in the vertical direction or the spatial direction of the time axis direction in picture unit,
- a spectral spread step for spectrally spreading an additional information so that the same data is contained at least in an interval in 1 horizontal interval or an interval in each 1 vertical interval in the repetition interval using the spread code strings generated in the spread code repetition step, and
- a superimposition step for superimposing the spectral spread code generated in the spectral spread step on the video signal.

The second video signal transmission method in accordance with the present invention is a video signal transmission method for transmitting a video signal on which a spectrally spread additional information is superimposed, which method comprises:

- a spread code generation step for generating a plurality of spread code strings which contains 1 chip or a plurality of chips per interval in 1 horizontal interval or 1 chip or a plurality of chips per interval in 1 vertical interval and in which chips having the same data are arranged in the vertical direction or the spatial direction of the time axis direction in picture unit in the continuous plurality of horizontal intervals or a plurality of vertical intervals at the generation start timing of the period of 1 horizontal period, 1 vertical period, or a plurality of vertical periods synchronously with the video sync signal by means of a plurality of spread code generation means,
- a spread code switching step for switching the plurality of spread code strings in the horizontal direction, vertical direction, or the spatial direction,
- a spectral spread step for spectrally spreading the additional information data having the same content for at least the same series of spread code string using the spread code string switched in the spread code switching step, and
- a superimposition step for superimposing the spectral spread signal generated in the spectral spread step on the video signal.

According to the first video signal transmission method in accordance with the present invention, chips are arranged in the vertical direction in a plurality of horizontal intervals repeated in the spread code repetition step. Therefore, even if noise removal utilizing correlation of the video signal in horizontal line unit in the plurality of horizontal intervals, the spectral spread signal superimposed on the video signal is not detected as the difference, and hence the spectral spread signal will not be removed or deteriorated.

Similarly, even if thinning out or interpolation in horizontal line unit is carried out due to picture size conversion involving aspect ratio change or change of the number of scanning lines for changing television system, the superimposed additional information remains reproducible, and is transmitted consistently.

Chips having the same data of the spectral spread signal are arranged in the spatial direction of the time axis direction in picture unit (referred to simply as time axis direction) in a plurality of vertical intervals repeated in the spread code repetition step. Therefore, when noise removal system utilizing correlation between fields or frames of the video signal is used, the spectral spread signal superimposed on the video signal is not detected as the difference even though the difference is taken between fields or frames, hence the spectral spread signal will not be removed and deteriorated. Even if special speed playback or cut edition is performed, similarly, the spectral spread signal is transmitted consistently.

Because spectral spread is performed using the different spread code respectively for a plurality of horizontal intervals or a plurality of vertical intervals in the first video signal transmission method, it is possible to superimpose different additional information using the different spread codes, and thus it is possible to increase the quantity of superimposed additional information.

As described herein above, the spectrally spread additional information will not be removed or deteriorated ever if noise removal system utilizing correlation of the video signal is used, and even if thinning out or interpolation in horizontal line unit in the vertical direction of the video signal is carried out, the additional information superimposed on the video signal is extracted consistently.

According to the second video signal transmission method in accordance with the present invention, the additional information is spectrally spread with switching the spread code of different series supplied from the different spread code generation means every plurality of horizontal intervals or plurality of vertical intervals, and is superimposed on the video signal. Hence, chips generated using the different spread code is provided also in the horizontal direction, and the chips can be arranged in the time axis direction. As the result, the same effect as that obtained in the invention described in claim 1 is obtained, and further it is possible to increase the quantity of additional information to be superimposed on the video signal.

BRIEF DESCRIPTION OF THE DRAWINGS

FIGS. 13–13F are a block diagram for illustrating another example of the PN generation control of the video signal output device shown in FIG. 2.

FIGS. 19A–19E are a block diagram for illustrating one example of the PN generation control in the video signal output device shown in FIG. 14.

FIG. 22 is a block diagram for illustrating one example of a circuit in the case that the SS anti-duplication control signal is superimposed on the compressed video signal data using the present invention.

DETAILED DESCRIPTION OF THE PREFERRED EMBODIMENTS

One embodiment of a video signal transmission method, superimposed information extraction method, video signal output device, video signal receiving device, video signal recording medium in accordance with the present invention will be described in detail with reference to the drawings hereinafter.

A video signal output device applied to a recording/playback device of DVD (a digital video disk) (referred to as DVD device hereinafter) is described hereinafter The description about sound signal system is omitted to simplify explanation.

[Video Signal Output Device of the First Embodiment]

Figure 1:
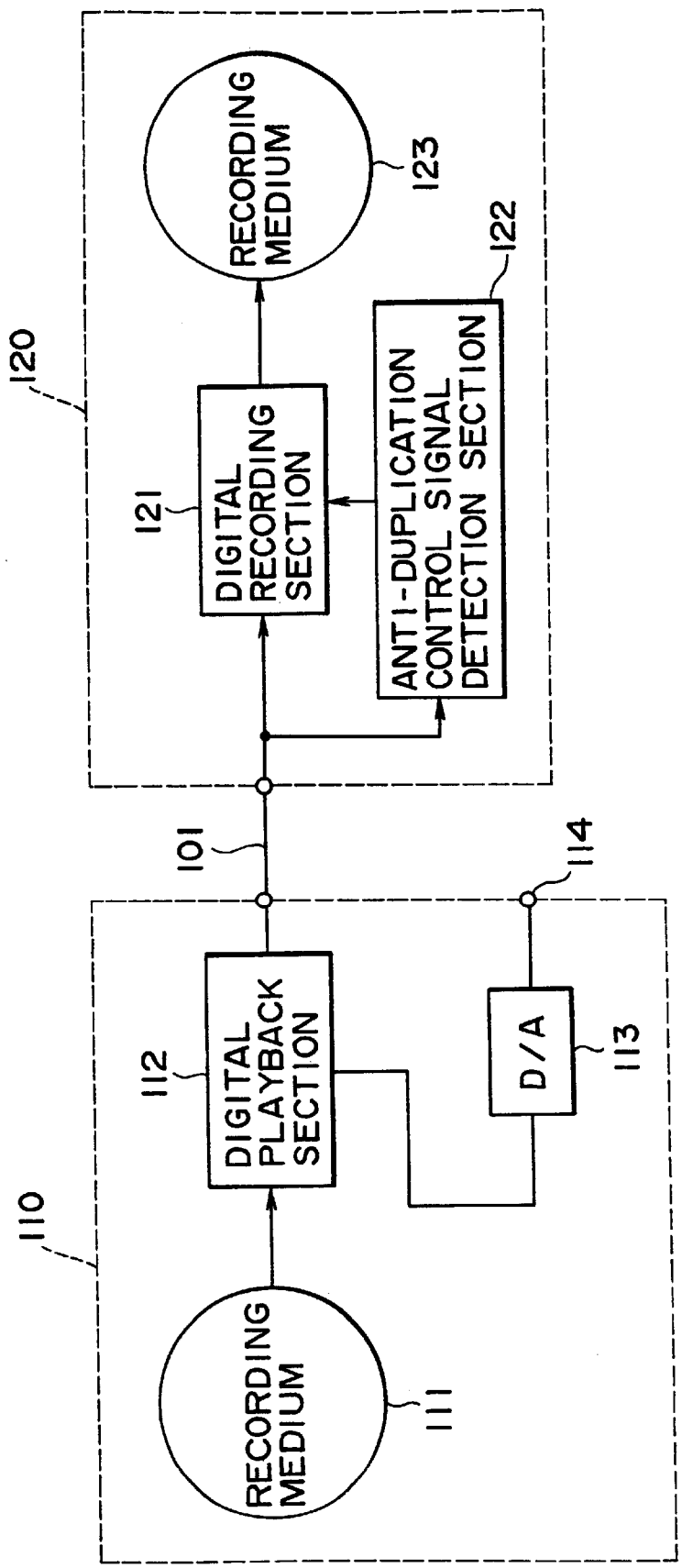
FIG. 1 is a block diagram for illustrating the conventional structure of a duplication prevention control system.
Figure 2:
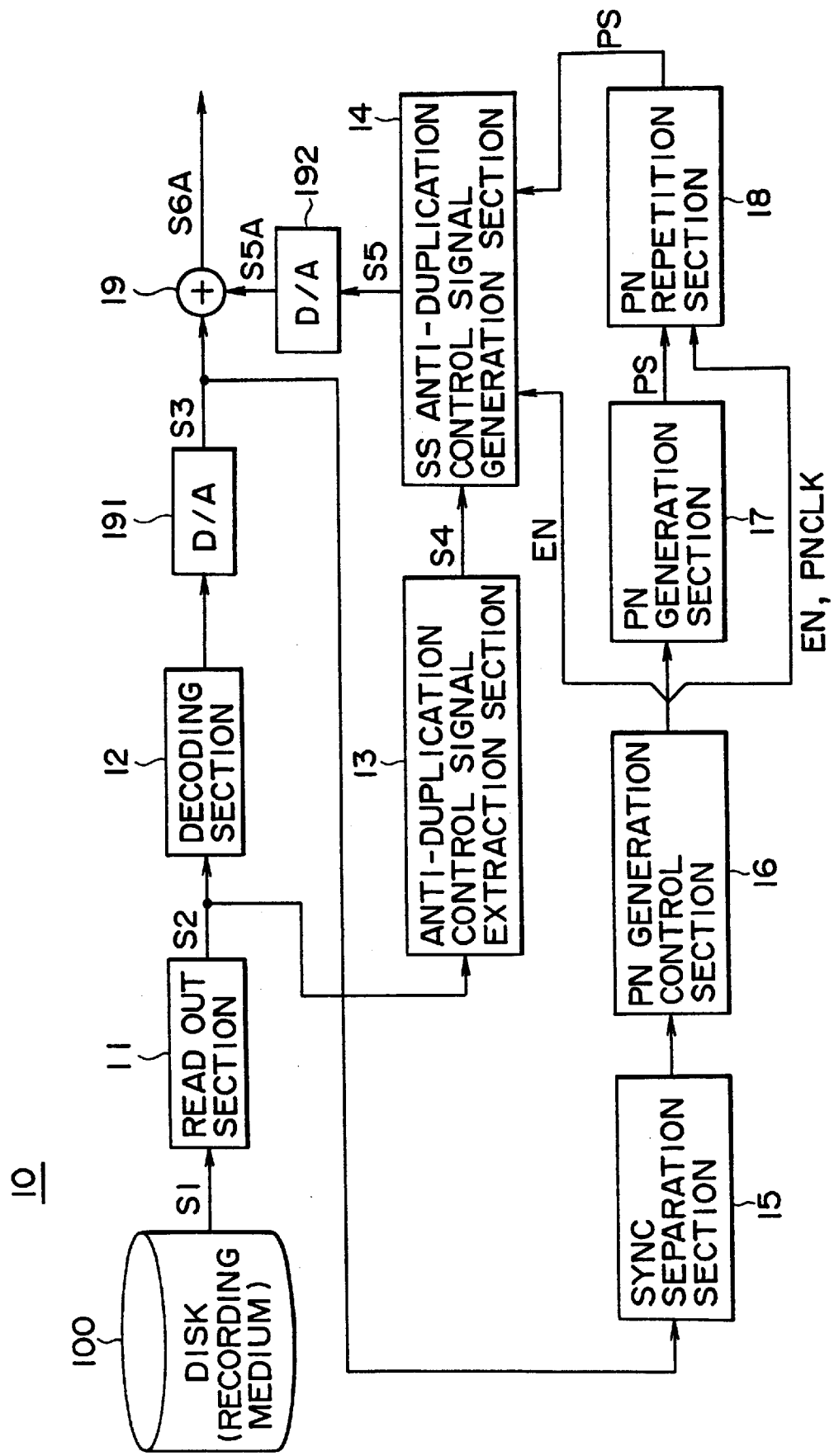
FIG. 2 is a block diagram for illustrating one embodiment of the video signal output device in accordance with the present invention.

FIG. 2 is a block diagram for illustrating an information signal output device 10 (referred to simply as output device hereinafter) of the first embodiment. In other words, the output device 10 is corresponding to a playback system of a DVD device in the first embodiment.

In FIG. 2, in a recording medium 100, digitized images and audio signals are recorded together with an anti-duplication control signal as additional information. The recording medium 100 is a DVD in this embodiment. The anti-duplication control signal may be recorded on the innermost or outermost TOC (table of contents) or a track area known as the directory, or it may be inserted on a track in which image data or audio data is recorded, namely, on the same track but on the area different from the data recording area. An example described hereinafter is of the latter case, namely the case that the anti-duplication control signal is read out at the same time as the video signal is read out.

The anti-duplication control signal may have the content of generation restriction for permitting only the first generation, or may be a signal for inhibition or permission of video signal duplication, and composed of 1 bit or several bite only for description.

As shown in FIG. 2, the output device 10 of the embodiment is provided with a read out section 11, decoding section 12, anti-duplication control signal extraction section 13, SS (SS stands for spectral spread hereinafter) anti-duplication control signal generation section 14, sync separation section 15, PN generation control section 16, PN generation section 17, PN repetition section 18, addition section 19, D/A conversion circuits 191 and 192.

The read out section 11 extracts a playback video signal component S2 from the signal S1 obtained by playing back the recording medium 100, and supplies it to the decoding section 12 and anti-duplication control signal extraction section 13.

The decoding section 12 performs decoding processing on the playback video signal component S2, generates a digital video signal, and supplies it to the D/A conversion circuit 191. The D/A conversion circuit 191 D/A converts the digital video signal to generate an analog video signal S3 having the sync signal, and supplies it to the sync separation section 15 and addition section 19.

The anti-duplication control signal extraction section 13 extracts the anti-duplication control signal S4 added to the playback video signal component S2, and supplies it to the SS anti-duplication control signal generation section 14.

On the other hand, the sync separation section 15 extracts the horizontal sync signal H and vertical sync signal V from the analog video signal S3, and supplies it to the PN generation control section 16.

The PN generation control generates an enable signal EN for indicating the interval where a PN code is generated, PN code reset timing signal RE (abbreviated as reset signal RE hereinafter) for indicating generation start timing of a PN code, and clock signal CLK using the horizontal sync signal H and vertical sync signal V as the reference signal.

Figure 3:
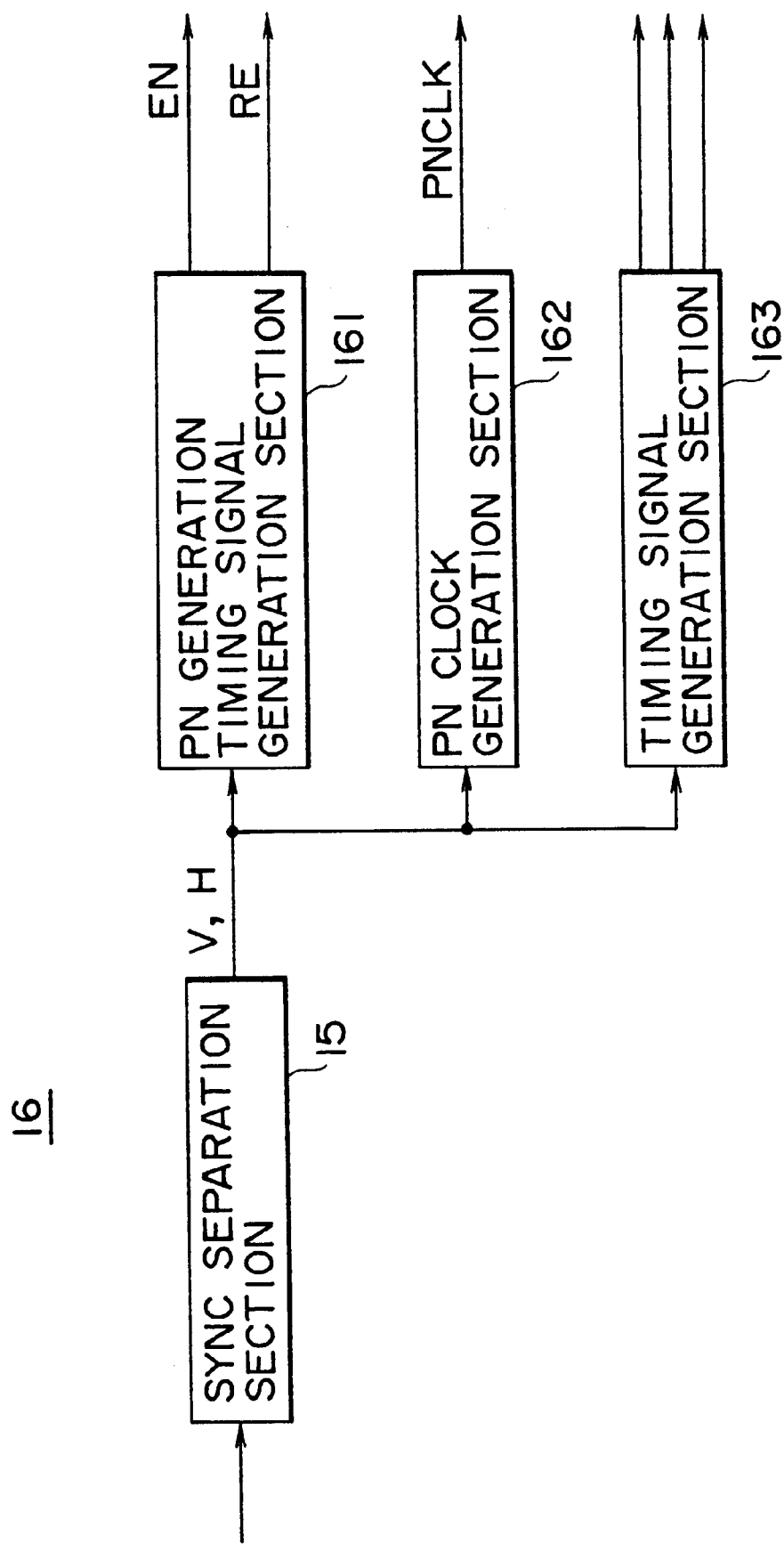
FIG. 3 is a block diagram for illustrating one example of the PN generation control section of the video signal output device in accordance with the present invention.

FIG. 3 is a block diagram for illustrating the PN code generation control section 16 of this embodiment. As shown in FIG. 3, the PN generation control section 16 of this embodiment is provided with a PN generation timing signal generation section 161, PN clock generation section 162 having PLL, and timing signal generation section 163, and the horizontal sync signal H and vertical sync signal V from the sync separation section 15 are supplied to the PN generation timing signal generation section 161 and timing signal generation section 163, and the horizontal sync signal H is supplied to the PN clock generation section 162 from the sync separation section 15.

Figure 4:
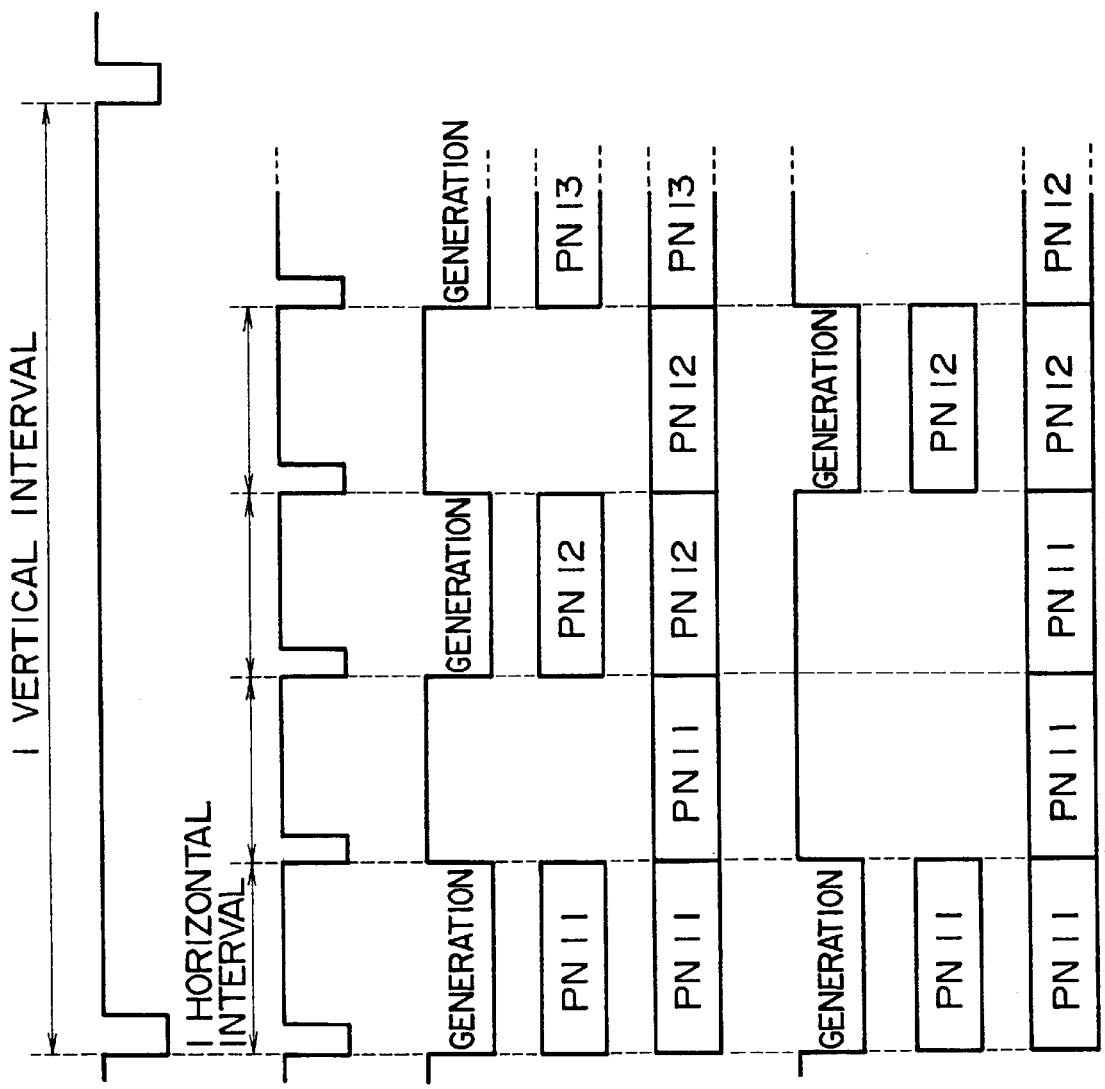
FIGS. 4A–4H are a diagram for describing one example of the PN code generation timing signal generated in the video signal output device shown in FIG. 2.

The PN generation timing signal generation section 161 generates a reset signal RE having the vertical period for determining repetition period of the PN spread code string used for spectral spread as shown in FIG. 4(A) using the vertical sync signal V as the reference signal.

The PN generation timing signal generation section 161 generates a PN generation enable signal EN using the horizontal sync signal H (refer to FIG. 4(B)) as the reference signal in this example. In this example, the PN generation enable signal EN is generated as a signal for generating a PN code from the PN generation section 17 during 1 vertical interval N (N is an integer of 1 or larger) vertical interval apart. In FIG. 4(C), the PN generation enable signal EN is generated during 1 horizontal interval with 1 vertical interval apart. As shown in FIG. 4(C), the enable signal EN is low active.

The PN clock generation section 162 generates a PN clock PNCLK synchronous with the horizontal sync signal H using the PLL. The PN clock PNCLK is a clock for determining the chip period of the spread code.

The timing signal generation section 163 generates various timing signal used in the output device 10 based on the horizontal sync signal V and vertical sync signal H.

The PN generation enable signal EN, PN code rest signal RE, and PN clock signal PNCLK generated in the PN generation control section 16 are supplied to the PN generation section 17. The PN generation enable signal EN and PN clock signal PNCLK are also supplied to the PN repetition section 18.

The PN generation section 17 generates a PN code correspondingly to the clock signal PNCLK, enable signal EN, and PN code reset timing signal RE. In detail, the PN generation section 17 is reset in response to the reset signal RE at the vertical period in this example, and generates a PN code string PS having a pre-determined code pattern from its head. Further, the PN code generation section 17 generates a PN code string PS in response to the clock signal PNCLK only while the PN generation section 17 is activated by the enable signal EN and in the condition ready for PN code generation (enable condition).

In this example, as described herein above, because the PN generation section 17 is in the condition ready for PN code generation while the enable signal EN is in low level, the PN generation section 17 is ready for PN code generation every second horizontal interval as shown in FIG. 4(C), and generates a PN code at the rate of 1 chip every 1 clock of the clock signal PNCLK. In this case, because the PN generation section 17 is not reset in 1 vertical interval, different PN code strings PN11, PN12, PN13, . . . are generated respectively on the above-mentioned every second horizontal interval as shown in FIG. 4(D) However, because the PN generation section 17 is reset at the head of the vertical interval in response to the reset signal RE, in each vertical interval, different PN code strings PN11, PN12, PN13, . . . are generated respectively on every horizontal interval similarly.

Figure 5:
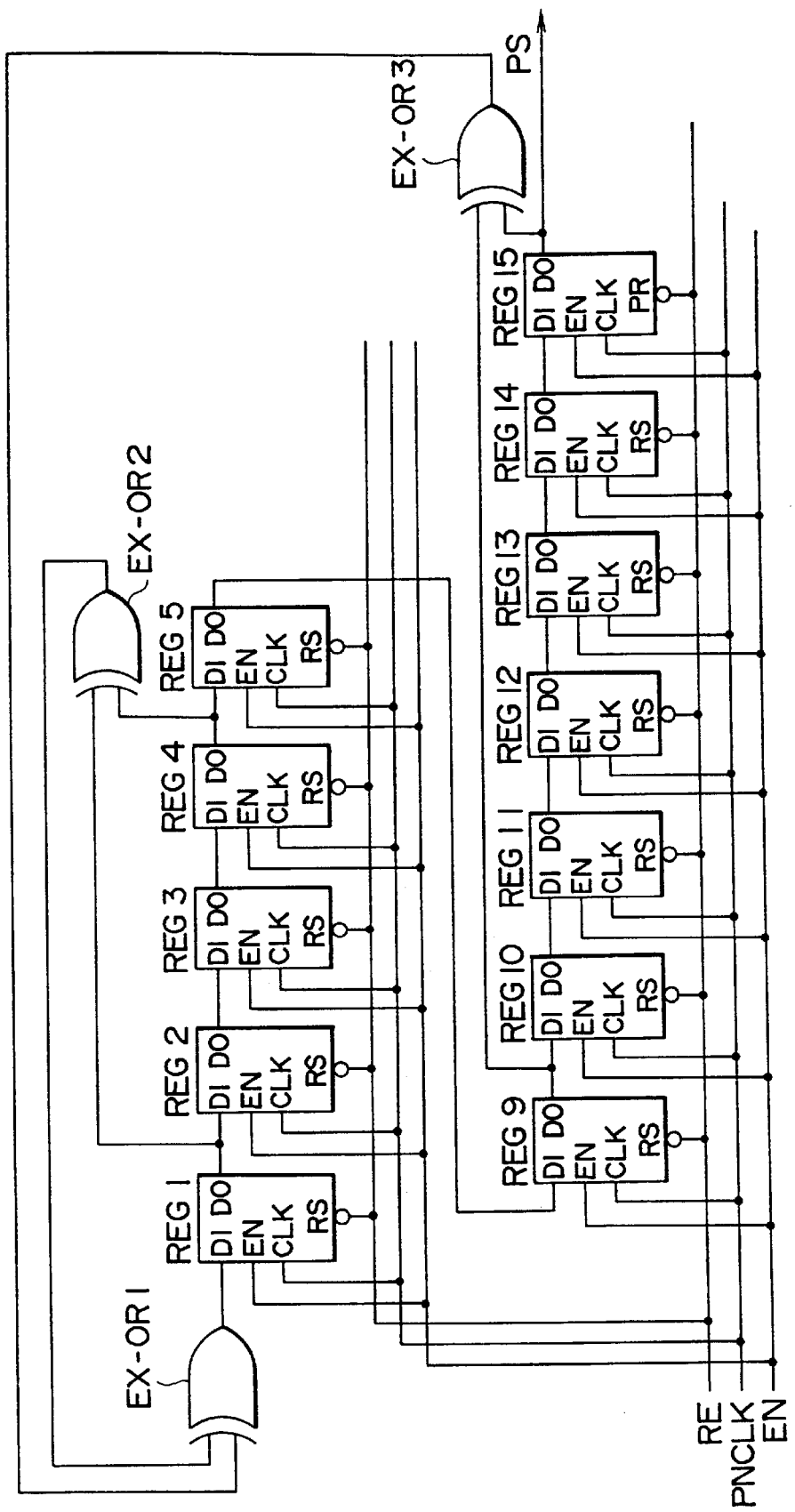
FIG. 5 is a block diagram for illustrating an exemplary structure of the PN generation section of the video signal output device shown in FIG. 2.

FIG. 5 is a block diagram for illustrating the structure of the PN generation section 17. The PN generation section 17 of this example comprises 15 D-flip-flops REG1 to REG 15 which constitutes a 15 step shift register and exclusive-OR circuits EX-OR1 to EX-OR3 for operating a suitable tap output of the shift register. As described herein above, the PN generation section 17 generates M series of PN code strings PS based on the enable signal EN, PN clock signal PNCLK, and PN code rest timing signal RE. The PN code string PS generated by the PN generation section 17 is supplied to the multiplication circuit 163.

In the case of this example, the clock frequency of the clock PNCLK supplied to the PN code generation section 17 is, for example, 500 kHz, generates the total 4095 chips of the PN code string in 1 vertical interval by generating the PN code string on every second horizontal interval in 1 vertical interval.

The PN code strings PS supplied from the PN generation section 17 obtained as described herein above is supplied to the PN repetition section 18, and the enable signal and clock PNCLK form the PN generation control section 16 is also supplied to the PN repetition section 18.

Figure 6:
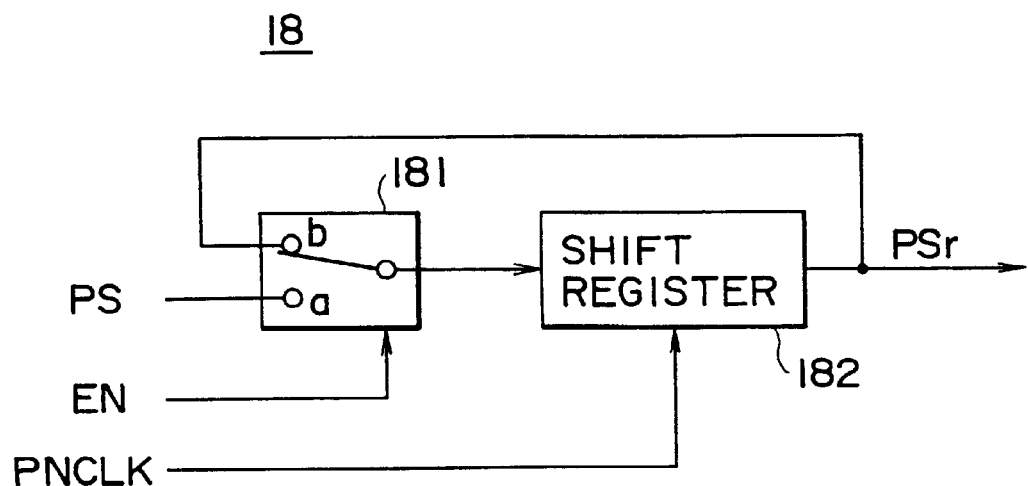
FIG. 6 is a block diagram for illustrating an exemplary structure of the PN repetition section of the video signal output device shown in FIG. 2.

FIG. 6 is an exemplary structure of the PN repetition section 18. In detail, the PN code repetition section 18 is composed of a switch circuit 181 and a shift register 182 having steps for every chips of the PN code contained in 1 horizontal interval. The above-mentioned PN code string PS is supplied to the one input terminal a-side of the switch circuit 181 and an output of the shift register 182 is supplied to the other input terminal b-side.

The enable signal EN is supplied as a switching signal of the switch circuit 181, the switch circuit 181 is switched to the input terminal a-side in the interval where the PN code string is generated due to the low level enable signal EN, and on the other hand, switched to the input terminal b-side in the interval where the PN code string is not generated due to the high level enable signal EN. The clock PNCLK is supplied to the shift register 182 as a shift clock.

Accordingly, the PN code string PS comprising PN code strings PN11, PN12, PN13, . . . generated during the every second interval in the PN generation section 17 is transferred respectively to the shift register 182 through the switch circuit 181. Though no PN code string is supplied from the PN generation section 17 in the residual horizontal intervals, because the switch circuit 181 is switched to the input terminal b-side, the shift register 182 outputs repeatedly the PN code strings PN11, PN12, PN13, . . . of 1 horizontal interval extracted during the prior horizontal vertical respectively.

As described herein above, in the case of this example the PN code string generated every second interval in the PN generation section 17 is repeated on the subsequent horizontal interval respectively, and consequently the PN repetition section 18 generates the PN code string PSr in which the respective PN code strings PN11, PN12, PN13, . . . in each 1 horizontal interval continues over two horizontal intervals as shown in FIG. 4(E). The PN code string PSr supplied from the PN repetition section 18 is then supplied to the SS anti-duplication control signal generation section 14.

The SS anti-duplication control signal generation section 14 spectrally spreads the anti-duplication control signal S4 extracted by the above-mentioned anti-duplication control signal extraction section 13 using the PN code string PSr, and generates a spectrally spread anti-duplication control signal (referred to as SS anti-duplication control signal hereinafter) S5 to be superimposed on the video signal S3.

The SS anti-duplication control signal generation section 14 is provided with an anti-duplication control signal string generation section for generating an anti-duplication control signal string used for spectral spread and multiplication section for multiplying the generated anti-duplication control signal string by the PN code string PSr for spectral spread though they are not shown in the drawing.

In the case of this example, the anti-duplication control signal string generation section completes an anti-duplication control signal string in 1 horizontal interval synchronous with the generation timing of the PN code string PS in other words, a delimiter of bit occurs, and generates an anti-duplication control signal string having the same bit content in the subsequent repetition horizontal interval. To control the timing, the enable signal EN from the PN generation control section 16 is supplied to the SS anti-duplication control signal generation section 14. The anti-duplication control signal string is a low bit signal composed of 1 bit to several bits per 1 horizontal interval.

The SS anti-duplication control signal S5 generated in the SS anti-duplication control signal generation section 14 is supplied to the D/A conversion circuit 192. The D/A conversion circuit 192 converts the SS anti-duplication control signal S5 to an analog SS anti-duplication control signal S5A and supplies it to the addition section 19.

The addition section 19 superimposes the analog SS anti-duplication control signal S5A on the analog video signal S3 to generate an output video signal S6A, and outputs it. As described herein above, the addition section 19 functions as a superimposition means for superimposing the SS anti-duplication control signal S5A which is the anti-duplication control signal spectrally spread using the PN code string PSr. In this case the SS anti-duplication control signal S5A is superimposed in the a level lower than the dynamic range of the video signal. The video signal is not deteriorated because of superimposing in the manner as described herein above.

In the above-mentioned example, PN code strings PN11, PN12, PN13, . . . are generated respectively during 1 horizontal interval every second horizontal interval and the respective PN strings are repeated over two horizontal interval. However, it may be the case that using the enable signal EN having 1 horizontal interval of low level signal per three horizontal periods, PN code strings PN11, PN12, PN13, . . . are generated on 1 horizontal interval with 2 horizontal intervals apart, and the respective PN code strings are repeated over three horizontal intervals as shown in FIG. 4(H).

The PN code PSr is generated as described herein above, and the bit delimiter is generated with at least the horizontal period based on the PN code string PSr, and by spectrally spreading the anti-duplication control signal having the same bit content per 1 horizontal interval in the repeating interval of the PN code PSr, a spectrally spread signal, in which chips having the same data in the vertical direction in a plurality of horizontal intervals where the PN code is repeated is arranged and chips having the same data in the time axis of the pictured unit is arranged, is generated.

Figure 7:
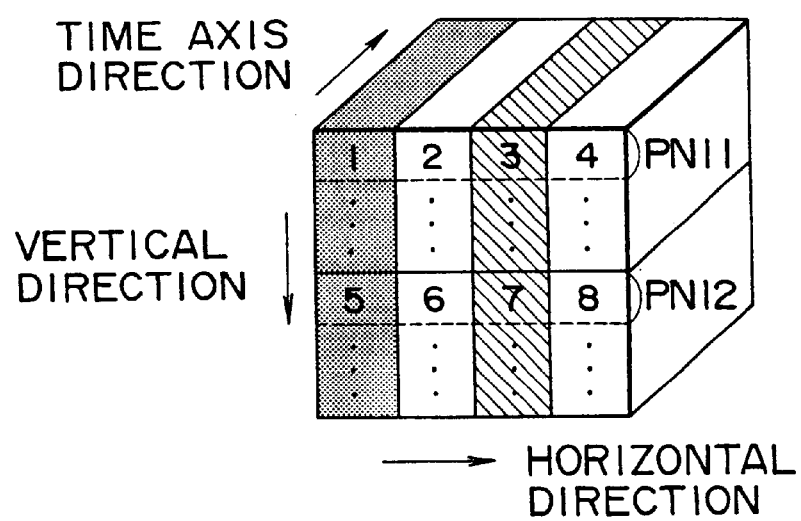
FIG. 7 is a conceptual diagram for describing generation of the PN code (mapping) used in the video signal output device shown in FIG. 2.

FIG. 7 shows generation structure of the PN code PSr generated by the PN repetition section in this example, that is the FIG. 7 is a diagram for illustrating mapping of the PN code PSr to the video signal. As described herein above, in this example, the PN code string PSr supplied from the PN repetition section 18 has a period of 1 vertical interval, and a plurality of horizontal intervals contains the same PN code string as 1 horizontal interval.

In FIG. 7, for convenience of simple description, 1 vertical interval is divided into two divided-intervals, the PN code string PN11 is repeated on the first half of 128 horizontal intervals, and the PN code string PN12 is repeated on the second half of 128 horizontal intervals. In the case of FIG. 7, exemplarily for description the PN code strings PN11 and PN12 contain 4 chips respectively. The PN code PSr is rest based on the reset signal having the vertical period, therefore all the vertical intervals are mapped in the same way.

As obvious in FIG. 7, chips having the same data are arranged in the vertical direction in a plurality of horizontal intervals where the PN code is repeated, and chips having the same data are arranged in the time axis direction in the picture unit. In detail, chips having different data are generated in the horizontal direction, but chips having the same data are arranged repeatedly on a plurality of horizontal intervals where the PN code is repeated in the vertical direction and also chips having the same data are arranged repeatedly in the time axis direction. The anti-duplication control signal is completed in 1 horizontal interval for the respective same PN code strings PN11, PN12, PN13, . . . in 1 horizontal interval unit, therefore, four planes on which the same chips are formed in the vertical direction and time axis direction in a plurality of horizontal intervals where the PN code is repeated is formed and total 8 planes are conceptually formed in this example as shown in FIG. 7 for the SS anti-duplication control signal.

Therefore, in the case that the spectrally spread anti-duplication control signal is superimposed on the video signal using the PN code string PSr, if noise is removed utilizing correlation of the video signal as described herein above, operation of taking the difference between adjacent horizontal lines, adjacent fields, or adjacent frames does not result in detection of the SS anti-duplication control signal as a difference.

Hence, in the case that the noise removal utilizing correlation of the video signal or interpolation or thinning in the horizontal or time axis direction is performed as described herein above in the output device 10, the device such as recording device, described hereinafter, for receiving supply of the video signal from the output device 10, or between the output device 10 and a device which receives supply of the video signal from the output device 10, the video signal on which the spectrally spread anti-duplication control signal (SS anti-duplication control signal) is superimposed is transmitted and supplied to a subsequent device consistently.

Because the anti-duplication control signal is superimposed on the video signal after the anti-duplication control signal has been spectrally spread, the SS anti-duplication control signal does not deteriorate the video signal, and also the SS anti-duplication control signal can not be removed from the video signal.

Furthermore, according to this embodiment, because different PN codes are used respectively on a plurality of horizontal intervals and bit of the additional information can be changed for the respective PN code, as the whole, the increased quantity of information spectrally spread and superimposed as the additional information is transmitted.

FIG. 8 shows the relation between the anti-duplication control signal and video signal in the form of a spectrum. The anti-duplication control signal is a low bit rate signal containing a small quantity of information, and the narrow-band signal as shown in FIG. 8(a). The anti-duplication control signal becomes a wide-band signal as shown in FIG. 8(b) when subjected to spectral spread. The spectral spread signal level is reduced in inverse proportion to enlargement ratio of the band width.

Figure 8A:
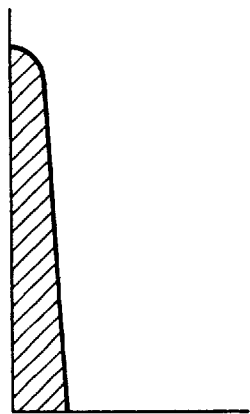
FIGS. 8A–8D are a diagram for showing the relation between the SS anti-duplication control signal and video signal in the form of spectrum.
Figure 8B:
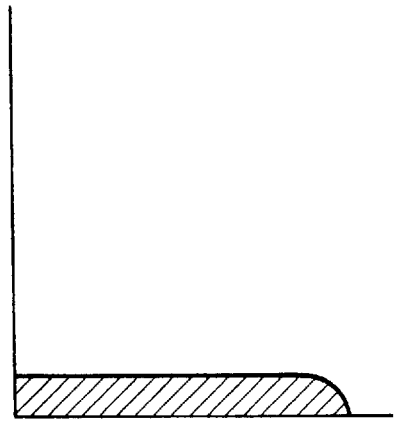
Figure 8C:
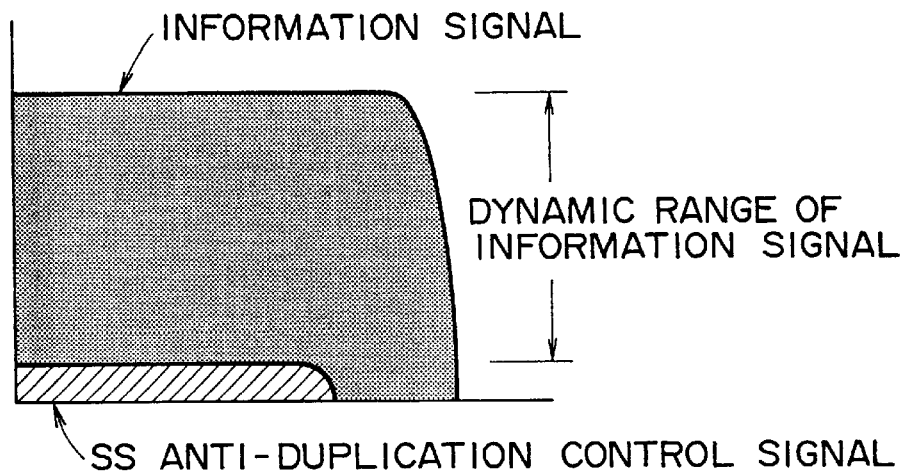

The SS anti-duplication control signal S5A namely the spectral spread signal is then superimposed on the video signal in the addition section 19. The SS anti-duplication control signal S5A is superimposed at the level lower than the dynamic range of the video signal which is served as the information signal as shown in FIG. 8(c). By superimposing the spectral spread signal in such way, the main information signal is not deteriorated. Therefore, when the video signal on which the SS anti-duplication control signal is superimposed is supplied to a monitor receiver to display a picture, a good played back picture is obtained without adverse effect of the SS anti-duplication control signal.

Figure 8D:
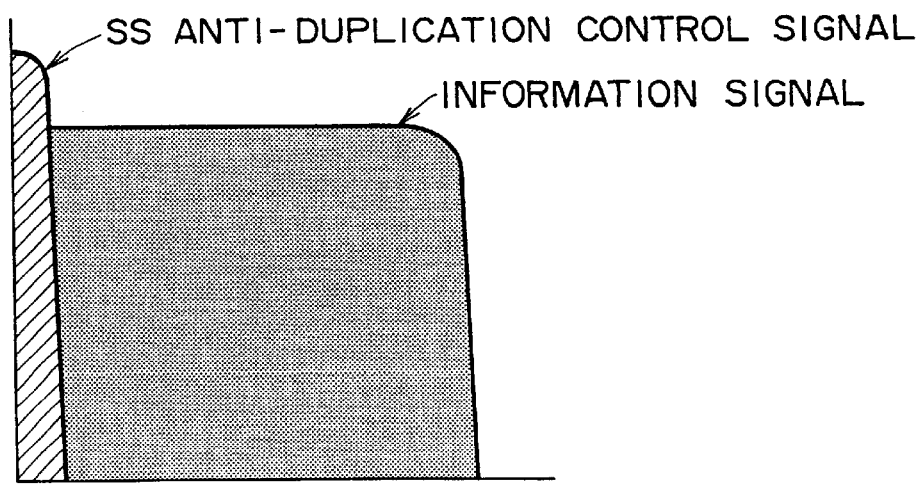

On the other hand, as described hereinafter, when inversion spectral spread is performed to detect the SS anti-duplication control signal in the recording side, the SS anti-duplication control signal is restored to the original narrow-band signal as shown in FIG. 8(d). By giving a sufficient band spread factor, the power of the inversion spread anti-duplication control signal exceeds that of the information signal, and the information signal becomes detectable.

In this case, because the SS anti-duplication control signal superimposed on the analog video signal is superimposed on the same time interval and the same frequency, it is impossible to remove or modify the analog video signal by using a frequency filter or replacement of an information.

Therefore, the SS anti-duplication control signal superimposed on the video signal will not be removed, and the SS anti-duplication control signal is supplied consistently to a monitor receiver or recording device.

As described herein above, the analog output video signal S6A on which the anti-duplication control signal S5A is superimposed is supplied to a monitor receiver for displaying a picture or a recording device 20 described herein under.

[Video Signal Recording Device of the First Embodiment]

Next, a recording device 20 which receives the video signal S6A from the above-mentioned output device 10 and records the video signal therein is described.

Figure 9:
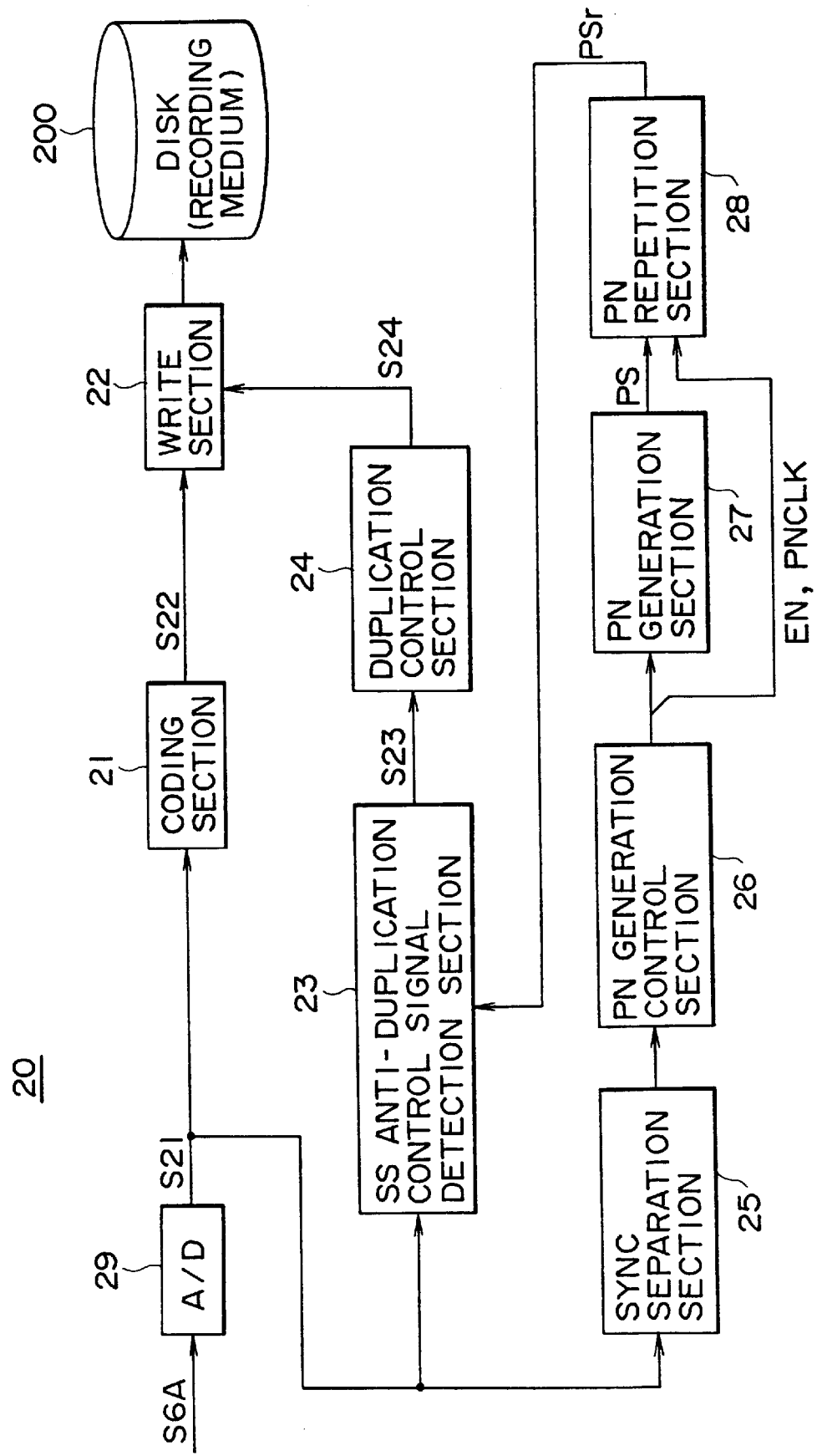
FIG. 9 is a block diagram for illustrating one embodiment of the video signal recording device to which a video signal reception device in accordance with the present invention is applied.

FIG. 9 is a block diagram for illustrating the video signal recording device 20 (referred to simply as recording device hereinafter) used for the video signal duplication control system of this embodiment. In other words, the recording device 20 is equivalent to a recording system of the DVD device in the first embodiment.

The recording device 20 is provided with a coding section 21, write section 22, detection section 23 for detecting an anti-duplication control signal spectrally spread and superimposed on the video signal (referred to as SS anti-duplication control signal detection section), duplication control section 24 for performing control such as duplication permission or duplication inhibition, sync separation section 25, PN generation control section 26, PN generation section 27, PN repetition section 28, and A/D conversion circuit 29. A recording medium 200 is a DVD where the recording device 20 writes the video signal.

The video signal S6A supplied from the output device 10 is converted to the digital video signal S21 by the A/D conversion circuit 29 and supplied to the coding section 21, SS anti-duplication control signal detection section 23, and sync separation section 25.

Upon receiving the digital video signal S21, the coding section 21 performs coding processing such as removal of the video sync signal and data compression of the digital video signal to generates a recording digital video signal S22 to be supplied to the recording medium 200, and supplies it to the write section 22.

The sync separation section 25 extracts the horizontal sync signal H and vertical sync signal V from the uncoded digital video signal S21 and supplies it to the PN generation control section 26.

In this embodiment, the PN generation control section 26 of the recording device 20 has the same structure as that of the PN generation control section 16 of the output device 10 described using FIG. 3. Therefore, the PN generation control section 26 having the structure shown in FIG. 3 is described herein for the purpose of description.

The PN generation timing signal generation section 161 of the PN generation control section 26 generates a PN code reset timing signal RE (referred to simply as reset signal RE hereinafter) for providing a reset timing of the inversion spread PN code string used for spectral spread corresponding to the output device 10 using the vertical sync signal V as the reference signal, and generates an enable signal EN corresponding to the enable signal EN in the output device 10 described herein above. The reset signal RE generated herein is the same signal as the PN code reset timing signal RE generated in the PN generation control section 16 of the output device described herein above, and provides timing corresponding to the starting position of a vertical interval of the video signal.

The PN clock generation section 162 of the PN generation control section 26 generates a PN clock signal PNCLK synchronous with the horizontal sync signal H. The clock signal PNCLK is a signal corresponding to the clock signal PNCLK used in the output device 10 described hereinbefore. The timing signal generation section 163 of the PN generation control section 26 generates various timing signals based on the horizontal sync signal H.

The reset signal RE, enable signal EN, and clock signal PNCLK are generated in the PN generation control section 26 and are supplied to the PN generation section 27. The enable signal EN and clock signal PNCLK from the PN generation control section 26 are supplied also to the PN repetition section 28.

The PN generation section 27 has the same structure as that of the PN generation section 17 of the output device described hereinbefore using FIG. 5, and the PN repetition section 28 has the same structure as that of the PN repetition section 18 of the output device 10 described hereinbefore in FIG. 6. Therefore, the quite same PN code string PSr as that obtained for spectral spread in the output device 10 described hereinbefore is obtained, and the obtained PN code string PSr is supplied to the SS anti-duplication control signal detection section 23.

In this embodiment, the SS anti-duplication control signal detection section 23 is provided with a PN code generator and multiplication circuit to have a function as a spectral inversion spread means for performing spectral inversion spread and extracting the anti-duplication control signal superimposed on the video signal.

The SS anti-duplication control signal detection section 23 spectrally inversion spreads the video signal of each vertical interval on which the SS anti-duplication control signal is superimposed using the inversion spread PN code string that is the same PN code string PSr as the PN code string used for spectral spread, and extracts the anti-duplication control signal superimposed on the video signal. The extracted anti-duplication control signal S23 is supplied to the duplication control section 25.

The duplication control section 25 decodes the anti-duplication control signal S23, and judges whether the video signal supplied to the recording device 20 is a signal of duplication inhibited or duplication permitted. Based on the judgement result, the duplication control section 25 generates a write control signal S24 and supplies it to the write section 22, and performs duplication prevention control such as writing permission or writing inhibition of the video signal S22.

The write section 22 writes the video signal S22 in the recording medium 200 if the write control signal S24 is a signal for permitting writing, and on the other hand, does not write the video signal S22 in the recording medium 200 if the write control signal S24 is a signal for inhibiting writing As described herein above, the recording device 20 of this embodiment spectrally inversion spreads the video signal on which the SS anti-duplication control signal is superimposed correspondingly to the output device 10 using the same PN code string as the PN code string PSr used for spectral spread of the anti-duplication control signal, and extracts the anti-duplication control signal superimposed on the video signal.

In this case, as described hereinbefore, the video signal output from the output device 10 has the SS anti-duplication control signal superimposed thereon having the same data in the vertical direction on a plurality of horizontal interval on which the PN code is repeated and having the same data in the time axis direction.

Hence, as described hereinbefore, even if the noise is removed utilizing correlation of the video signal, the SS anti-duplication control signal superimposed on the video signal will not be removed. Also, if thinning out or interpolation is performed in the vertical direction or in the time axis direction, the SS anti-duplication control signal superimposed on the video signal will not be damaged.

Therefore, even if special speed playback is performed or so-called cut edition is performed when the video signal is input to the recording device, it does not occur that the SS anti-duplication control signal deteriorates or the control content of the anti-duplication control signal which the SS anti-duplication control signal indicates cannot be judged. In other words, in the recording device 20, the spectrally spread anti-duplication control signal superimposed on the video signal is extracted consistently and correctly and the duplication prevention control corresponding to the extracted anti-duplication control signal is performed.

In the above-mentioned first embodiment, in the output device 10 and recording device 20, the PN code string is generated at the same timing as that of vertical sync signal in the output device 10 and in the recording device 20 by generating the PN code reset timing signal RE using the video sync signal, in this case using the vertical sync signal, as the reference signal.

Hence, in the recording device 20, for example, it is not required that the PN code string which spectrally spreads the anti-duplication control signal superimposed on the video signal is known in advance and phase control is performed so as to generate the PN code string for inversion spread at the same timing. Therefore, the anti-duplication control signal is extracted rapidly by performing inversion spectral spread.

Further, as described herein above, in the output device 10 and recording device 20, because the frequency of the clock signal PNCLK is determined using the horizontal sync signal as the reference signal, both in the output device 10 and in the recording device 20, the clock signal having the same frequency can be generated consistently.

[Modified Examples of the Video Signal Output Device of the First Embodiment]

[First Modified Embodiment]

In the above-mentioned example, the PN generation section has only one PN generator, but the PN generation section 17 may be provided with a plurality of PN generators, and the plurality of PN generators are switched every plurality of vertical intervals, thereby additional information to be superimposed can be increased.

Figure 10:
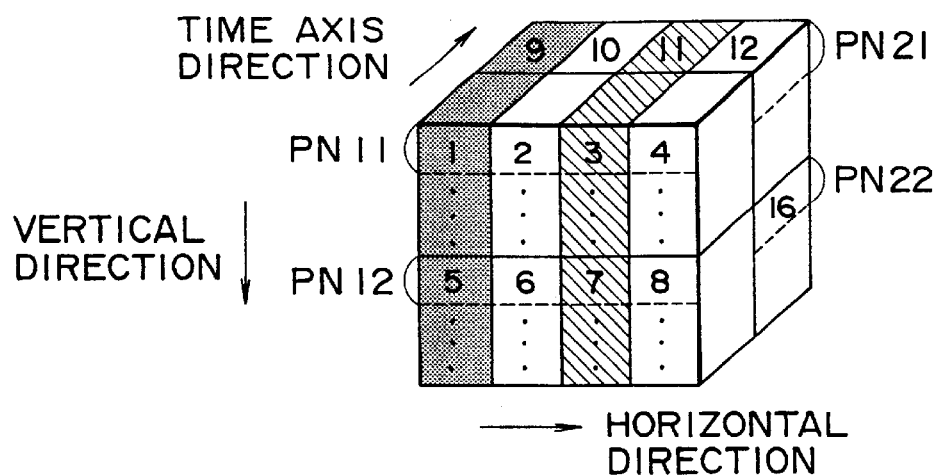
FIG. 10 is a conceptual diagram for describing generation of the PN code (mapping) generated using the video signal output device shown in FIG. 2.

FIG. 10 is a diagram for describing mapping of the PN code PSr on the video signal in this case. In the example in FIG. 10, the PN code strings PN11, PN12 supplied from one PN generator to be reset at the vertical period repeat over a plurality of horizontal intervals in the front plurality of vertical intervals in the time axis direction as described hereinbefore, and the additional information spectrally spread using two different PN code strings PN 11 and PN12 is superimposed in the vertical direction. In the rear plurality of vertical interval in the time axis direction, another PN code generator is used, the PN code strings PN21, PN 22 supplied from this PN code generator repeat similarly over a plurality of horizontal intervals, and the additional information spectrally spread using the two different PN code strings PN21 and PN22 is superimposed.

In this case, switching timing of the plurality of PN generators is synchronized with the detection timing of I-picture (Intra-coded picture) obtained in, for example, decoding section 12. In detail, in the case of this example, though the video signal was subjected to data compression using MPEG system in which predictive coding was employed, the I-picture is an I-picture that is generated by coding one frame video signal as it is without using predictive coding, in the case of P-picture (Predictive-coded picture) or B-picture (Bidirectionally-coded picture) generated using motion compensative prediction, the I-picture prevents playback image quality from being deteriorated in the time axis direction, and usually, is inserted at a certain period of a plurality of vertical intervals.

When the I-picture is detected by the decoding section 12, the detection timing signal is transmitted to the PN generation control section 16. Then the PN generation control section 16 switches a plurality of PN generators which is components of the PN generation section 17 correspondingly to the detection timing of the I-picture.

In the case of analog signal, timing information for switching the PN generator may be inserted in the specified horizontal interval of the vertical blanking time period every plurality of vertical intervals.

[Second Modified Example]

Though in the example described herein above, the PN generation section 17 is reset using the reset signal RE having the vertical period synchronous with the vertical sync signal V so that the repetition interval of the PN code string coincides with the plurality of horizontal interval in one vertical interval, spectral spread of the additional information using a plurality of PN code strings can be performed in the time axis direction in which the repetition interval of the PN code string is a plurality of vertical intervals in the reset period. In the case of this example, the PN generation section 17 may have only one PN generator for performing sufficient function.

Figure 11:
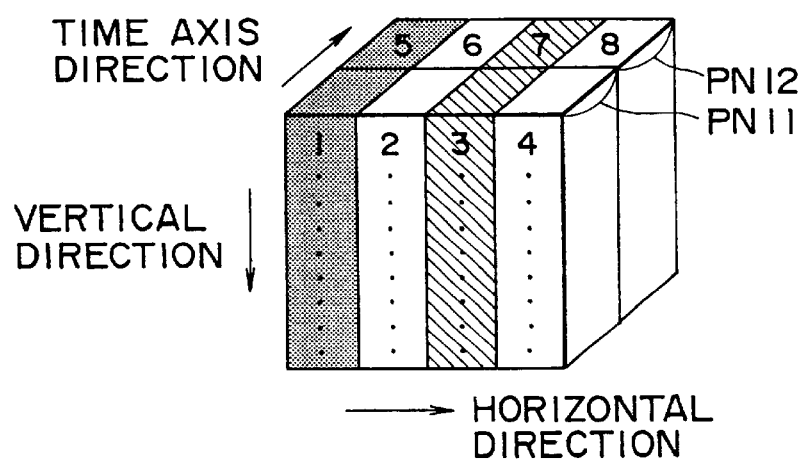
FIG. 11 is a conceptual diagram for describing generation of the PN code (mapping) generated using the video signal output device shown in FIG. 2.

Mapping of the PN code PSr for the video signal used in the case of the second modified example is shown in FIG. 11. In the case of this example, the repeated PN code string 11 is generated in all the horizontal intervals. In the rear plurality of vertical intervals, the repeated PN code string 12 is generated in all the horizontal intervals.

[Third Modified Example]

Figure 13:
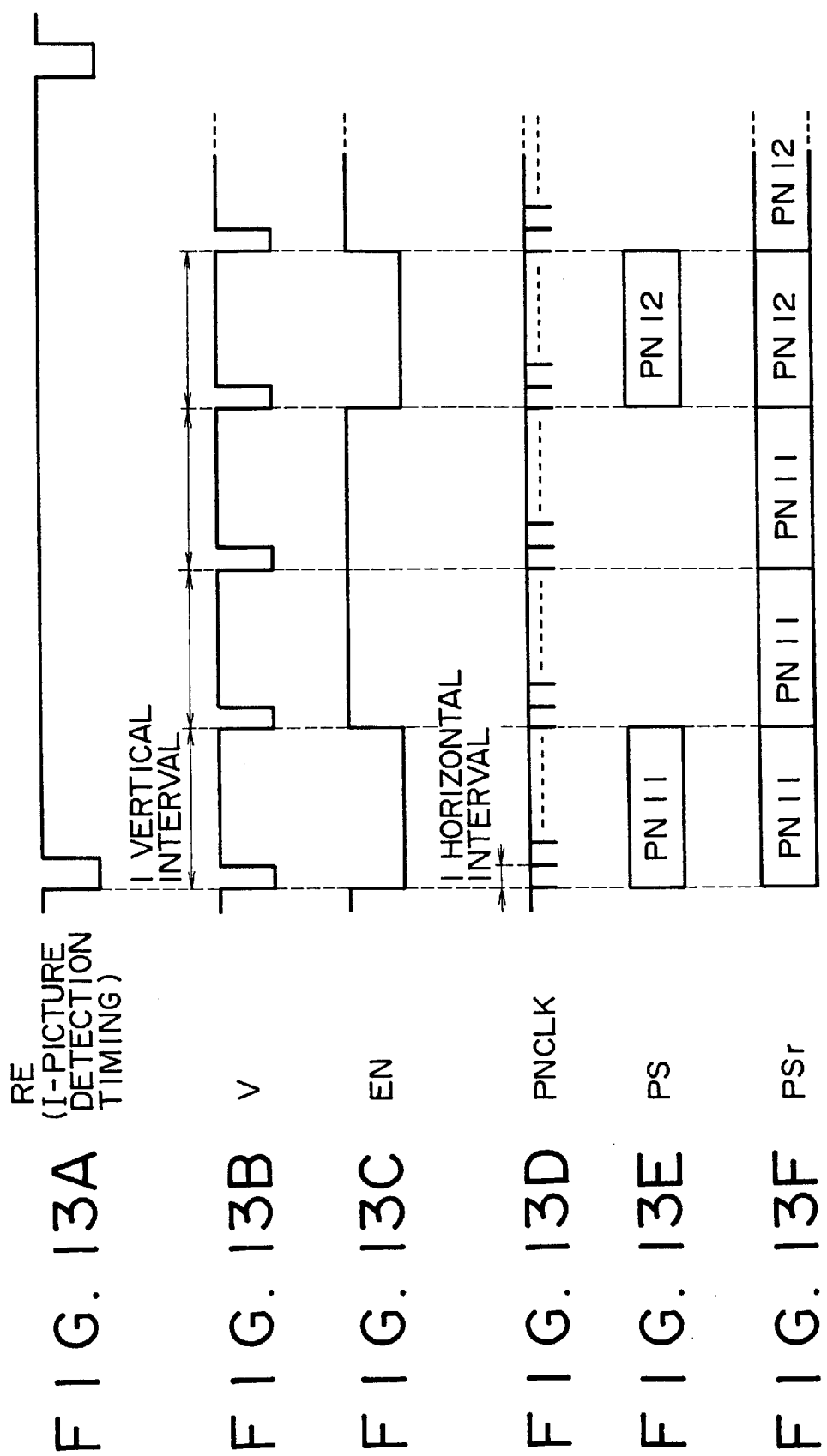

A time chart in the case of PN generation control in the third modified example is shown in FIG. 13. In the case of this example, the PN generation section has one PN generator, the detection timing signal of the above-mentioned I-picture is a reset signal as shown in FIG. 13, and the reset signal is a signal having one period of a plurality of vertical intervals.

The enable signal EN is a signal generated based on the vertical sync signal V (FIG. 13(B)) or a signal (FIG. 13(C)) of low level (active) during 1 vertical interval with two intervals apart in between.

The PN clock PNCLK supplied to the PN generator is signal having a horizontal period synchronous with the horizontal sync signal H as shown in FIG. 13(D). The PN clock PNCLK may be a signal having a period of a plurality of horizontal intervals.

In the case of such structure, PN code strings P11, P12, . . . are generated on one vertical interval with one or a plurality of vertical intervals apart in between as shown in FIG. 13(E) from the PN repetition section 18, and the PN code string PSr in which the above-mentioned PN code strings P11, P12, . . . repeat over a plurality of vertical intervals determined by the period of the enable signal is obtained.

Figure 12:
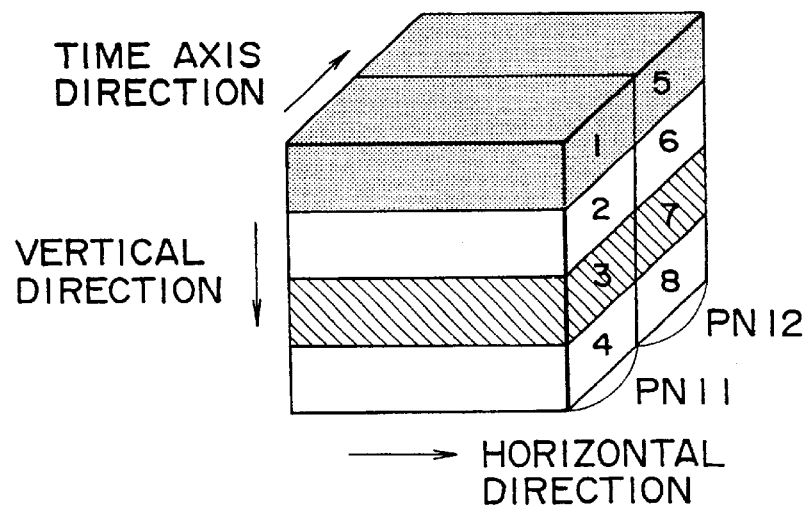
FIG. 12 is a conceptual diagram for describing generation of the PN code (mapping) used in the video signal output device shown in FIG. 2.

Therefore, the structure described above results in mapping of the PN code PSr for the video signal of the third example as shown in FIG. 12. In detail, 1 chip of the PN code is allocated to 1 horizontal interval or a plurality of horizontal intervals, and the anti-duplication control signal is spectrally spread as data which is completed during 1 vertical period per one PN code. The additional information spectrally spread using one PN code string repeats over a plurality of vertical intervals.

As described herein above, the additional information spectrally spread using a plurality of PN code strings is arranged in the time axis direction every plurality of vertical intervals. Therefore, quantity of information of the additional information can be increased in the time axis direction.

In the case of third modified example, because one chip having the same data constitutes the horizontal direction, the additional information can be transmitted without adverse effect of thinning out in pixel unit and interpolation by changing the picture size.

[Video Signal Output Device of the Second Embodiment]

Figure 14:
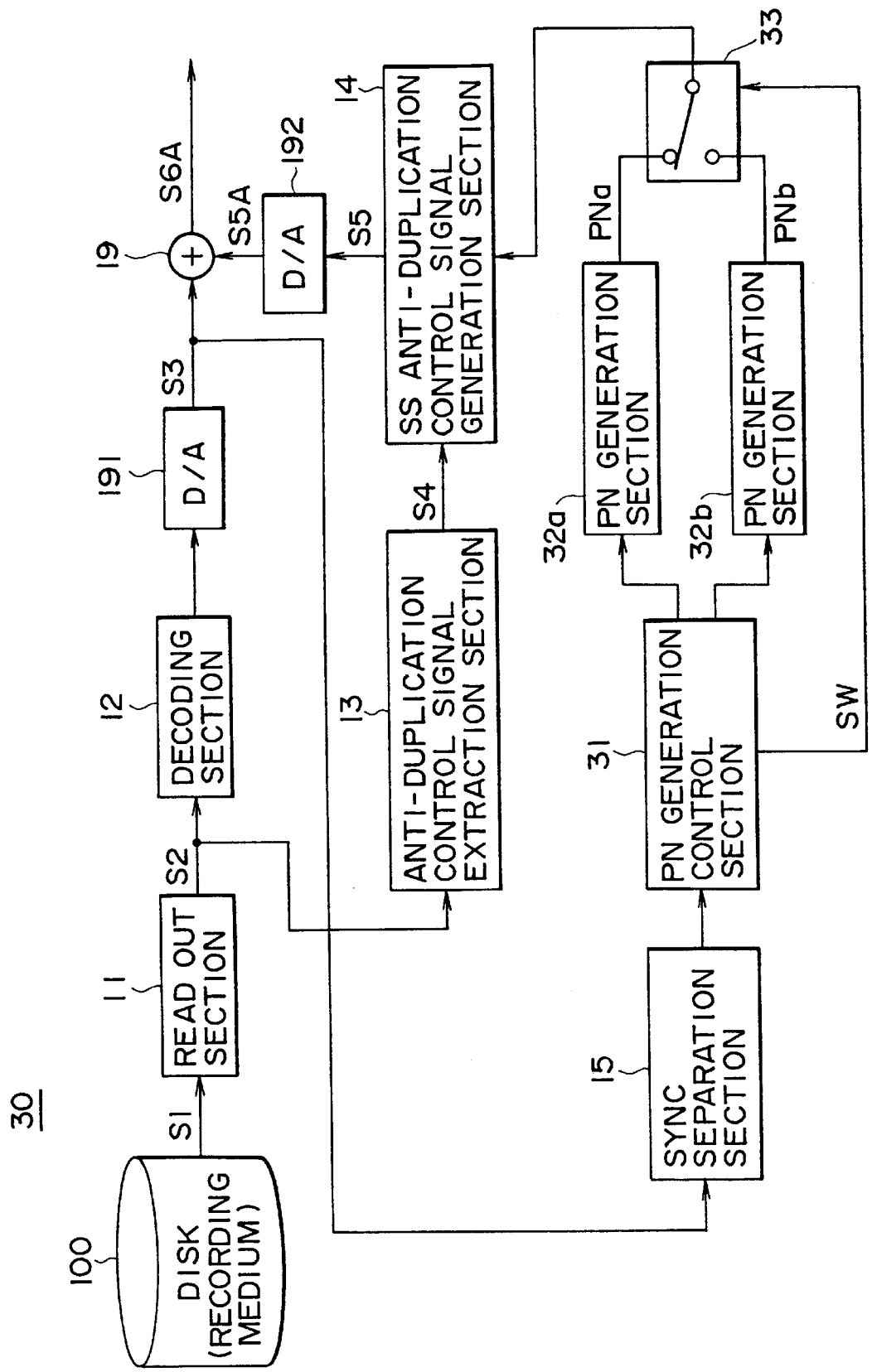
FIG. 14 is a block diagram for illustrating another embodiment of the video signal output device in accordance with the present invention.

FIG. 14 is a block diagram for illustrating the second embodiment of the video signal output device in accordance with the present invention, and in the drawing, the same components as components of the first embodiment described in FIG. 2 are given the same characters as used in FIG. 2, and detailed description is omitted for these components.

In the first embodiment, the same PN code is generated over a plurality of horizontal intervals or a plurality of vertical intervals by using repeatedly a part of the PN code string generated from one PN code generator. However, in the second embodiment, a plurality of PN code generators are provided, spectral spread is performed similarly as described hereinbefore by switching these PN generators with PN generation controlling. Further in the second embodiment, some performance, which is difficult to be realized in the first embodiment, can be realized by using a plurality of PN codes.

In the second embodiment, two PN generation sections 32a and 32b are provided, and a switch circuit 33 is provided for selecting and switching between PN code strings PNa and PNb supplied from these PN generation sections 32a and 32b.

The horizontal sync signal H and vertical sync signal V supplied from the sync separation section 15 are supplied to the PN generation control section 31. The PN generation control section 31 generates reset signals REa and REb for the above-mentioned two PN generation sections 32a and 32b, enable signals ENa and ENb, and clock signal PNCLK, controls generation of the PN code strings PNa and PNb from the two PN generation sections 32a and 32b, and generates a switching control signal SW for switching the switch circuit 33.

The switch circuit 33 supplies the PN code string obtained by switching and selection to the SS anti-duplication control signal generation section 14, and the anti-duplication control signal S4 supplied from the anti-duplication control signal extraction section 13 is spectrally spread in the same way as used in the above-mentioned first embodiment to generate the SS anti-duplication control signal S5. In the same way as described hereinbefore, the signal S5 is subjected to D/A conversion by means of D/A converter 192 to convert it to an analog signal, and the addition section 19 superimposes the analog signal on the video signal S3 and outputs it as an output signal S6A.

Figure 15:
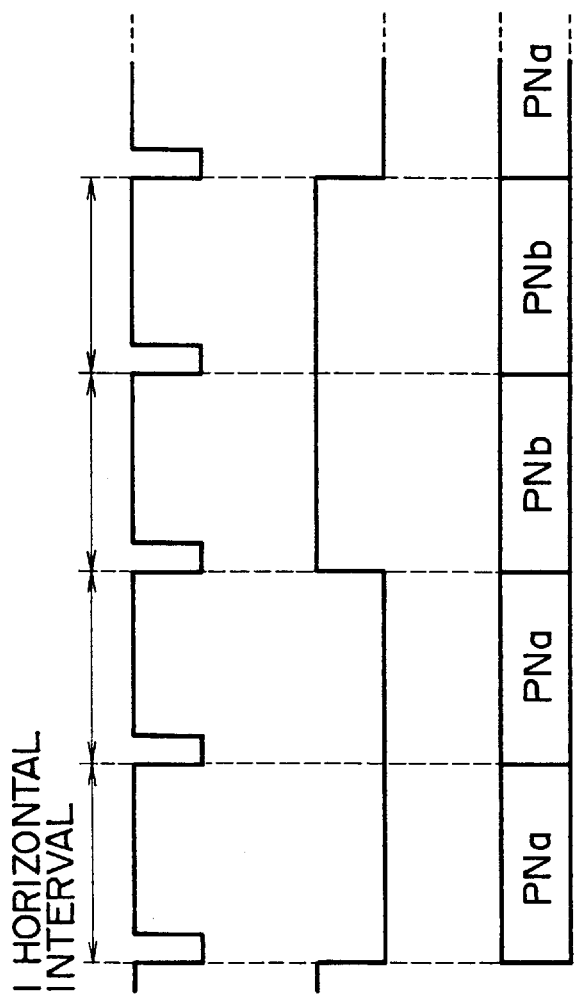
FIGS. 15A–15C are a diagram for describing one example of the PN code generation timing signal generated in the video signal output device shown in FIG. 14.

In the second embodiment, to perform mapping of the PN code for the video signal similarly as FIG. 7, a signal SW is shown in FIG. 15, and the two PN generation sections 32a and 32b are controlled, and the switch circuit 33 may be switched as shown in FIGS. 15A–15C.

In detail, the reset signals REa and REb reset the two PN generation sections 32a and 32b with the horizontal period as the horizontal period signal as shown in FIG. 15(A). The enable signals ENa and ENb are always in enabling. The switching control signal SW is a signal which is changing between high level and low level alternately every repeating plurality of horizontal intervals as shown in FIG. 15(B).

Hence, the two PN generation sections 32a and 32b generate always PN code strings PNa and PNb having 1 horizontal period respectively, the switch circuit 33 extracts alternately every required plurality of horizontal intervals, and generates the PN code string as generated in the first embodiment as shown in FIG. 15(C). Therefore, in the quite same way as used in the above-mentioned first embodiment, mapping of the PN code as shown in FIG. 7 can be realized.

To perform mapping as shown in FIG. 11, two additional PN generation sections my be added.

To perform mapping as shown in FIG. 11, a signal which repeats alternately between high level and low level every plurality of vertical intervals may be used instead of the switching control signal SW shown in FIG. 15(B).

Further, to perform mapping as shown in FIG. 12, a signal SW as shown in FIG. 16C is generated, and two PN generation sections 32a and 32b are controlled and the switch circuit 33 may be switched using signal SW.

In detail, the reset signals REa and REb reset two PN generation sections 32a and 32b with the vertical period as the vertical period signal as shown in FIG. 16(A). The enable signals ENa and ENb are always in enabling condition. The PN clock signal PNCLK is used as a clock of 1 horizontal period or a plurality of horizontal periods synchronous with the horizontal sync signal Has shown in FIG. 16(C), and the switching control signal SW is a signal which changes alternately between high level and low level corresponding respectively to the PN code strings PNa and PNb every repeating plurality of vertical intervals as shown in FIG. 16(C).

Hence, the two PN generation sections 32a and 32b generate always the PN code strings PNa and PNb having 1 vertical period respectively, and the switch circuit 33 extracts alternately the PNa and PNb every required plurality of vertical intervals, and generates a PN code string as shown in FIG. 16(D) Therefore, in the quite same way as used in the above-mentioned first embodiment, mapping as shown in FIG. 12 is realized.

Figure 16:
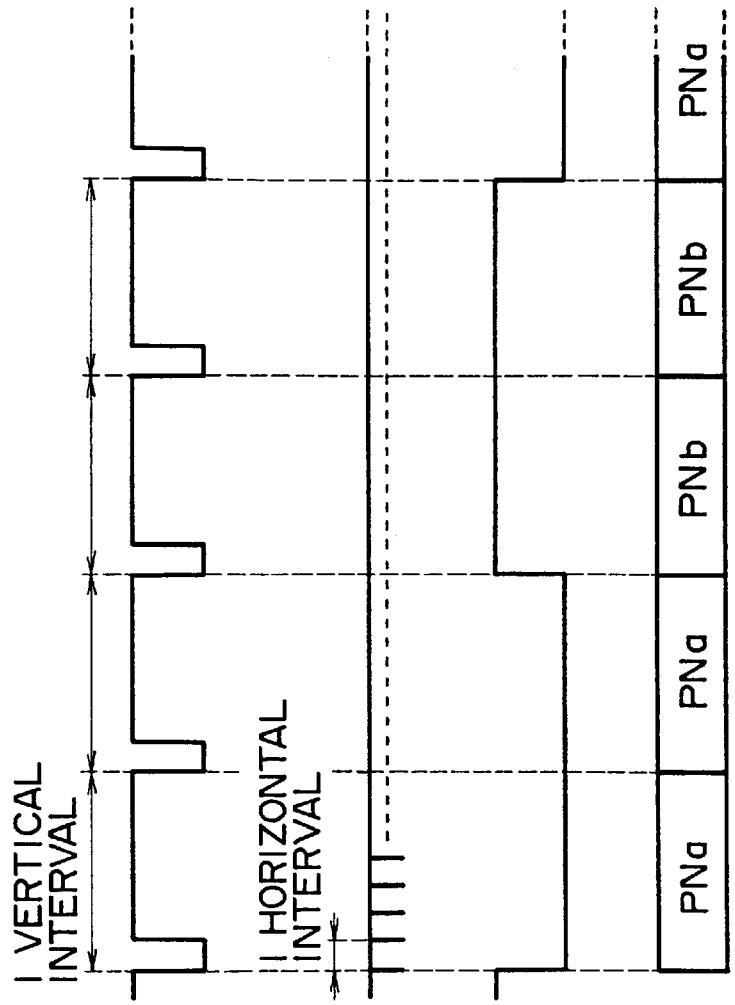
FIGS. 16A–16D are a diagram for describing another example of the PN code generation timing signal generated in the video signal output device shown in FIG. 14.

For resetting the PN generation sections 32a and 32b in the case of FIG. 16, detection timing of the above-mentioned I-picture may be used.

[Second Embodiment of the Video Signal Recording Device]

Figure 17:
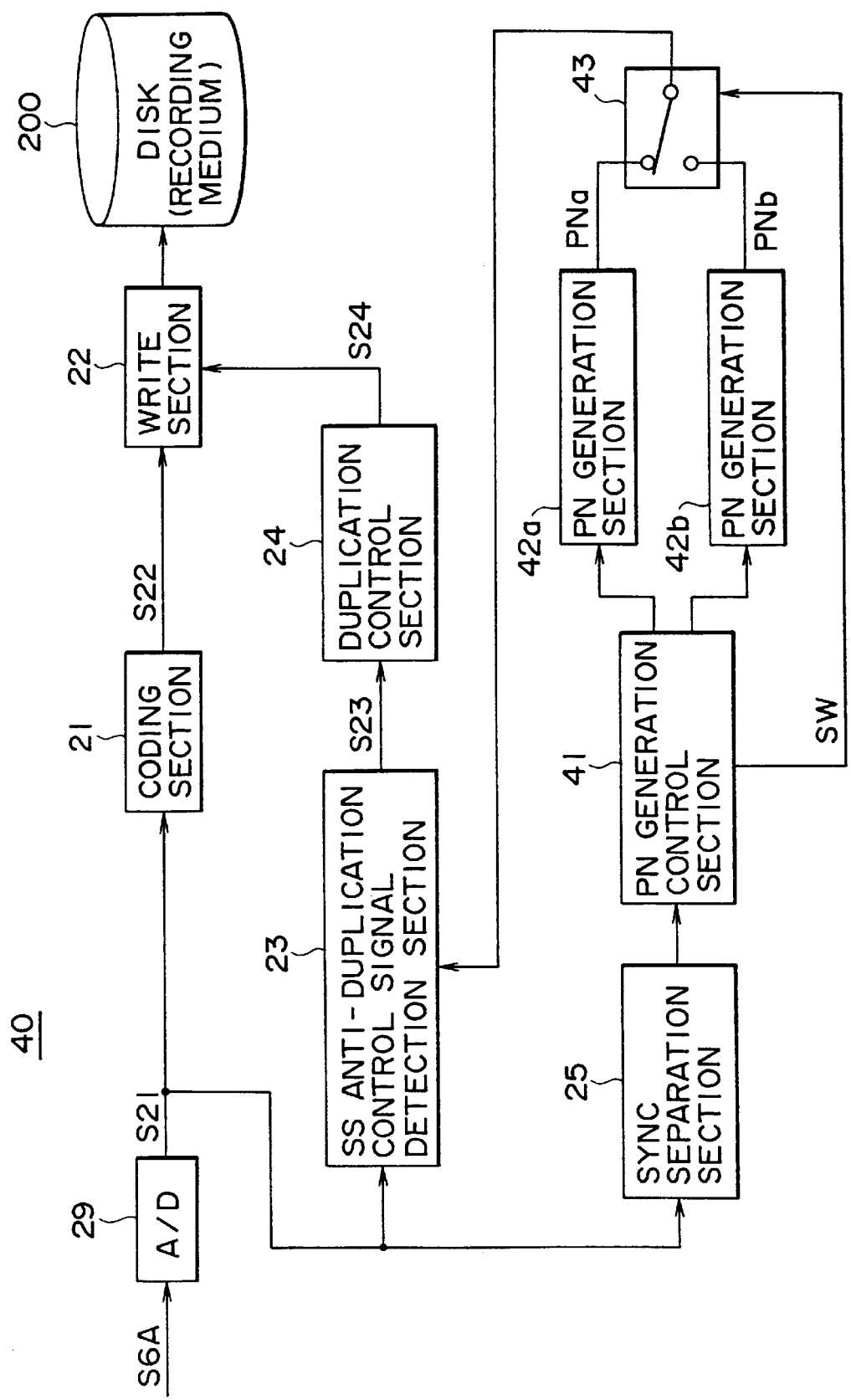
FIG. 17 is a block diagram for illustrating another embodiment of the video signal recording device to which the video signal reception device in accordance with the present invention is applied.

FIG. 17 is a block diagram for illustrating the second embodiment of the recording device corresponding to the second embodiment of the video signal output device.

In the recording device 40 of this second embodiment, the same components as those described in the recording device 20 of the first embodiment shown in FIG. 9 are given the same characters as used in FIG. 9 and detailed description of the components is omitted.

In this second embodiment, two PN generation sections 42a and 42b are provided for inversion spread, and a switch 43 is provided for switching and selecting between PN code strings PNa and PNb supplied from the respective PN generation sections 42a and 42b.

The horizontal sync signal H and vertical sync signal V from the sync separation section 25 are supplied to the PN generation control section 41. The PN generation control section 41 generates reset signals REa and REb for the above-mentioned two PN generation sections 42a and 42b, enable signals ENa and ENb, and clock signal PNCLK, controls generation of the PN code strings PNa and PNb supplied from the two PN generation sections 42a and 42b, and generates a switching control signal SW for switching circuit 43.

From this switch circuit 43, the same PN code string as the PN code string used for spectral spread is obtained. The switch circuit 43 supplies the PN code string to the SS anti-duplication control signal detection section 23, and restores the anti-duplication control signal S23 superimposed on the video signal by spectral inversion spread in the same way as used in the above-mentioned first embodiment. The restored anti-duplication control signal S23 is supplied to the duplication control section 24 to decode, and the write control signal S24 supplied from the duplication control section 24 controls the write section 22.

[Modified Example of the Second Embodiment]

In the case that the output device 30 and recording device 40 of the second embodiment are used, mapping of the PN code for the video signal, which can not be realized in the first embodiment, is realized.

Figure 18A:
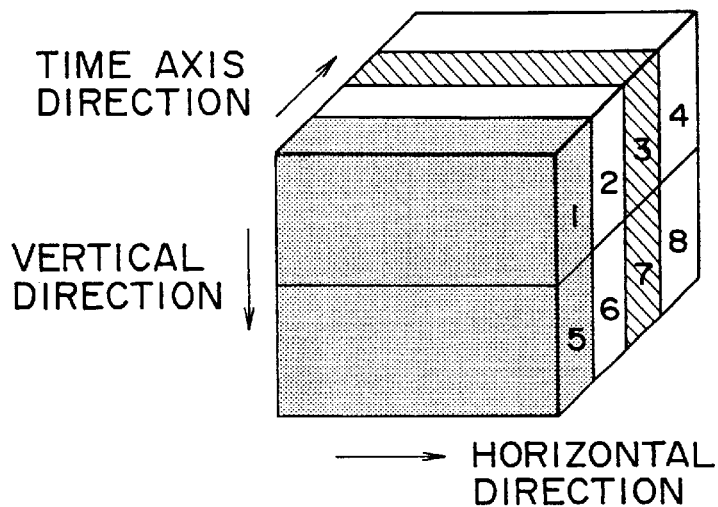
FIGS. 18A–18C are a conceptual diagram for describing generation of the PN code (mapping) used in the video signal output device shown in FIG. 14.

In detail, as shown in FIG. 18(A), the PN code is generated at a rate of one chip per 1 vertical interval or a plurality of vertical intervals in the time axis direction, and the PN code from the PN generator for the other PN series out of the plurality of PN series is generated similarly in the zone divided in the vertical direction. In FIG. 18(A), for example, "1, 2, 3, 4, . . . " is the PN code string of chip unit generated from the PN generator 32a, and "5, 6, 7, 8, . . . " is the PN code string of chip unit generated from the PN generator 32b.

For the mapping shown in FIG. 18(A), various timing signals as shown in FIG. 19A may be generated from the PN generation control section 31.

Figure 18B:
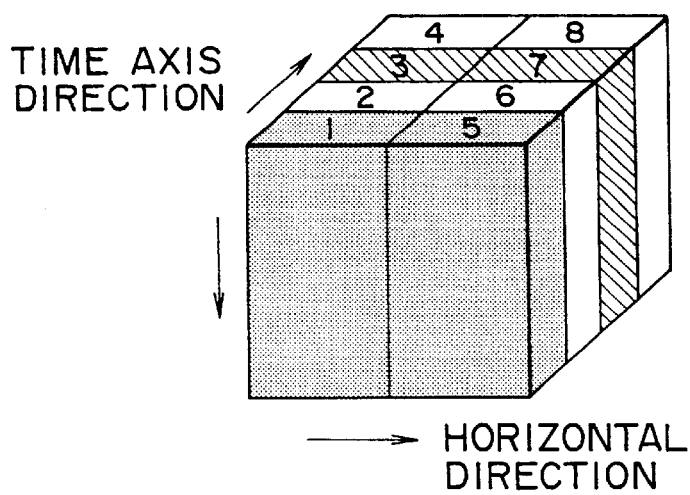
Figure 18C:
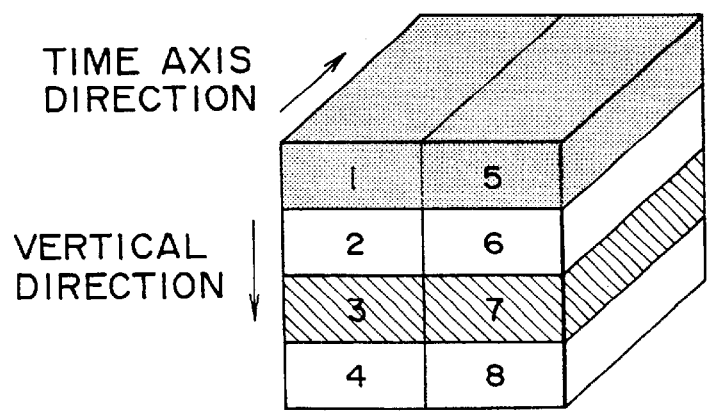

In detail, from two PN generators 32a and 32b, PN code strings PNa and PNb as shown in FIGS. 18(B) and 18(C) are generated successively in response to the clock PNCLK as shown in FIG. 19(A). The PN generation control section 31 generates the switching control signal SW for controlling the switch circuit 33 so as to select alternately the PN code strings PNa and PNb every ½ vertical period as shown in FIG. 19(D). Thereby, the PN code string as shown in FIG. 19(E) of mapping shown in FIG. 18(A) is obtained from the switch circuit 33.

Next, an example of mapping shown in FIG. 18(B) is obtained in the case that the switching control signal SW shown in FIG. 19(D) is switched every ½ horizontal interval. Hence, two PN code strings generated in the time axis direction is generated in a plurality of separate intervals in the horizontal direction.

An example of mapping shown in FIG. 18(C) is obtained in the case that the PN generators 32a and 32b are reset with the vertical period, 1 chip is generated per 1 horizontal period or a plurality of horizontal periods, and the switch circuit 33 is switched every ½ horizontal interval.

Figure 20:
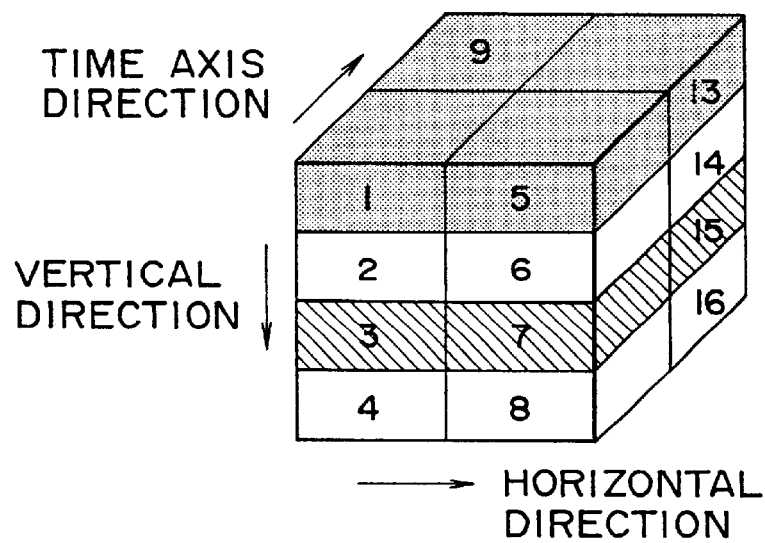
FIG. 20 is a conceptual diagram for describing generation of the PN code (mapping) used in the video signal output device shown in FIG. 2.

Further, an example of mapping shown in FIG. 20 is obtained in the case that, in addition to the example of FIG. 18(C), two PN generators are added, the total four PN generators are grouped into two two-generator groups, the PN generator is switched between two groups alternately every plurality of vertical intervals to perform the above-mentioned PN generation control using two PN generators.

In the case of embodiments described herein above that a plurality of PN generators are used, it is possible to generate the PN code string in different intervals not only in the vertical direction and time axis direction but also in the horizontal direction and it is possible to increase additional information.

[Third Embodiment]

The third embodiment is an application example shown in FIG. 7 of the first embodiment. In the case that the video signal of the system including MPEG system is subjected to data compression, the video signal is often divided in one picture unit into small blocks such as block or code equivalent individually to minute rectangular areas of a picture. Alternatively, the video signal is subjected to DCT (Discrete cosine transformation).

In the case of DCT, when a spectrally spread additional information is superimposed on an analog video signal or digital video signal, it can happen for a high frequency signal that the additional information is missed as data or deteriorated.

The third embodiment is presented in view of this problem. In detail, in the third embodiment, the PN code string is mapped so that 1 chip of the spectral spread signal is allocated on each 1 block which is the unit to be subjected to DCT before DCT is applied. A block having one block or more, for example, a macro-block having four blocks may corresponds to 1 chip. In such case, the spectral spread signal is contained in the DC component (direct current component) when the spectral spread signal is subjected to DCT, and the spectral spread signal will not be missed or deteriorated.

Figure 21:
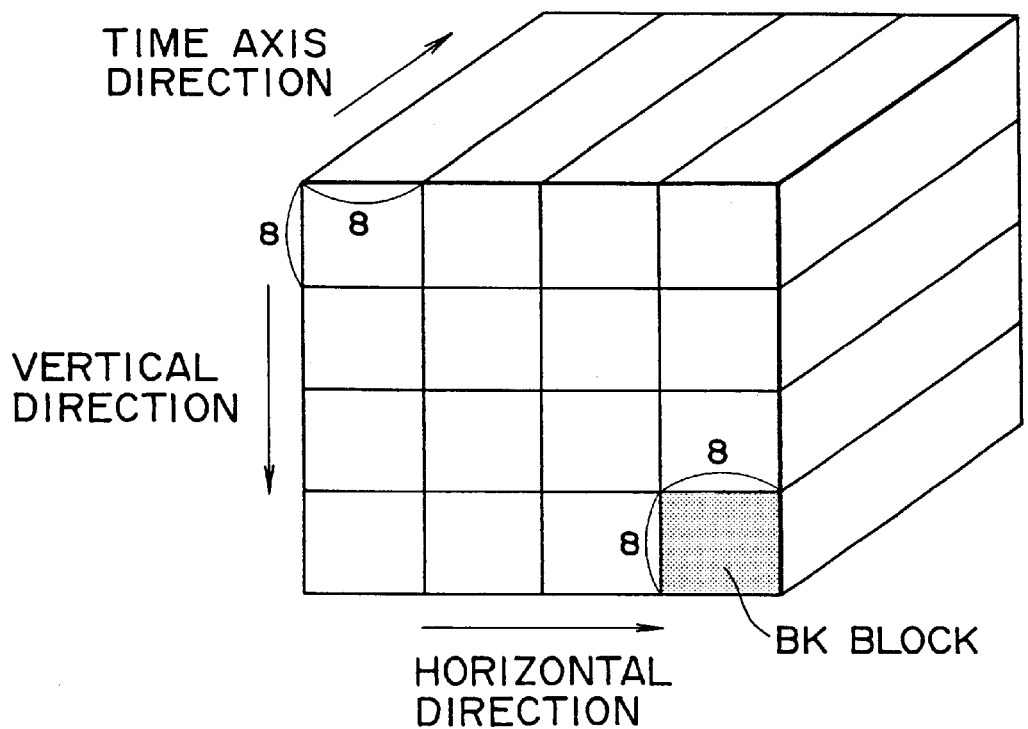
FIG. 21 is a diagram for describing the dividing into blocks in picture compression system.

For example as shown in FIG. 21, a video signal is divided into blocks BK having 8 pixels×8 pixels, the blocks BK are subjected to DCT processing in a block BK unit. Herein for example, the clock of 8 pixel unit contained in the horizontal direction of each block BK is used as the PN clock signal PNCLK, and the PN code string of 1 horizontal interval generated in the horizontal direction as described herein above repeats over 8 horizontal intervals in the vertical direction of the block BK as described in the first embodiment. Hence, the information of the same chip is contained in 1 block BK, and thus it is prevented that the PN code string is missed as data or deteriorated.

FIG. 22 is a block diagram for illustrating a superimposition circuit section for additional information in the third embodiment.

An analog video signal input through the input terminal 1001 is supplied to an addition circuit 1002 and also supplied to the sync separation circuit 1010. The horizontal sync signal and vertical sync signal output from the sync separation circuit 1010 are supplied to a timing signal generation section 1008 and also supplied to a PN generation control section 1012 which corresponds to the PN generation control section 16 in FIG. 2.

On the other hand, the timing signal for dividing into blocks output outputted from the timing signal generation section 1008 is supplied to the PN generation control section 1012. The PN generation control section 1012 generates the clock signal PNCLK of every 8 pixels that is the size of a block BK in the horizontal direction, enable signal EN which is in low level during the first horizontal interval output 8 horizontal intervals that is the size of a block BK, and reset signal RE of the vertical period, and these signals are supplied to an SS anti-duplication control signal generation section 1011. Of course, the clock signal PNCLK and enable signal EN are synchronous with the block timing signal.

The SS anti-duplication control signal generation circuit 1011 is provided with components of the PN generation section 17, PN repetition section 18, and anti-duplication control signal generation section 14 in the example shown in FIG. 2, generates the PN code string which repeats 8 horizontal intervals in the vertical direction of a block BK, and spectrally spreads the anti-duplication control signal supplied to it using the above-mentioned PN code string to generates an SS anti-duplication control signal. The SS anti-duplication control signal generation circuit 1011 then supplies the generated SS anti-duplication control signal to the addition circuit 1002. In this case, as described using FIG. 8 hereinbefore, the SS anti-duplication control signal having a level lower than that of the dynamic range of the video signal is supplied to the addition circuit 1002.

The addition circuit 1002 superimposes the above-mentioned SS anti-duplication control signal on the video signal The video signal on which the SS anti-duplication control signal is superimposed is converted to a digital signal by the A/D converter 1003, and supplied to the DCT processing section 1004 The DCT processing section 1004 divides the video signal using the timing signal supplied from the timing signal generation section 1008, and performs DCT operation processing.

The operation processing result from the DCT processing section 1004 is supplied to a quantization section 1005 and quantized. An output from the quantization section 1005 is supplied to the DCT processing section 1004 through a motion compensative circuit 1006, and the motion component is subjected to DCT operation. The output from the quantization section 1005 is converted to a variable length code using a Huffman code by a variable length coding section 1007, and output, for example, for recording or transmission.

Because the SS anti-duplication control signal is contained in the direct current component during inversion DCT operation when the compressed data transmitted or recorded as described herein above is decoded, the SS anti-duplication control signal is superimposed on the analog video signal without deterioration and restored. Therefore, the SS anti-duplication control signal is transmitted consistently and the duplication control is performed consistently.

In the example shown in FIG. 22, the case that the anti-duplication control signal is superimposed on the analog video signal is described, however, the anti-duplication control signal may be superimposed on a digital video signal after being subjected to A/D conversion.

[Other Modified Example]

In the above-mentioned embodiments, in the output devices 10 and 30, recording devices 20 and 40, the SS anti-duplication control signal is superimposed on all the intervals of the video signal, however, the SS anti-duplication control signal may be superimposed on only the effective picture interval which excludes the vertical blanking period and horizontal blanking period. Further, the SS anti-duplication control signal may be superimposed or not all the effective picture area. The area on which the SS anti-duplication control signal is to be superimposed may be prescribed desirably based on the horizontal sync signal, for example, an area having the first several clocks of no superimposition and following several ten clocks of superimposition.

In the above-mentioned embodiments, the case of analog connection that the analog video signal is supplied from the output devices 10 and 30 to the recording devices 20 and 40 is described. However, the present invention is also applicable to digital connection.

In other words, the spectrally spread anti-duplication control signal can be superimposed on the analog video signal and also on the digital video signal.

In the recording devices 20 and 40, the processing, in which the video signal to be supplied to the SS anti-duplication control signal detection section is subjected previously to filtration to extract partially the video signal of low level on which the spectrally spread anti-duplication control signal is superimposed, and the extracted video signal is supplied to the SS anti-duplication control signal detection section, may be used.

In the above-mentioned embodiments, the output device and recording device which are DVD devices are described, however, the present invention is by no means limited to the case, the present invention may be applied to output devices and recording devices having VTR, digital VTR, video disk, and video CD.

In the above-mentioned embodiments, the processing, in which the anti-duplication control signal added on the video signal recorded in a recording medium 100 is extracted, spectrally spread using the PN code, and superimposed on the video signal to be supplied to the recording devices 20 and 40, is described. However, a recording medium in which the video signal having the spectrally spread anti-duplication control signal superimposed previously thereon may be used.

In detail, the additional information is spectrally spread using the spread code having 1 period of the interval in 1 horizontal interval, having 1 period of the interval of shorter than 1 vertical interval, or having 1 period of the interval in a plurality of vertical intervals with reference to the video sync signal with respect to the video signal to be recorded in a recording medium, and the spectrally spread additional information is superimposed on the video signal. In this case, the spectrally spread additional information is superimposed on the video signal so that the chip having different data is arranged every prescribed plurality of pixels, every prescribed plurality of horizontal intervals, or every prescribed plurality of vertical intervals.

As described herein above, in the case of the recording medium in which the video signal having the spectrally spread anti-duplication control signal superimposed previously thereon is recorded, it is not necessary for the output device to perform processing such as extraction of the anti-duplication control signal, generation of the PN code, spectral spread, superimposition of the spectrally spread anti-duplication control signal on the video signal. In other words, in this case, the output device side only may play back and output the video signal recorded in the recording medium.

In this case, in the recording side, similarly to the recording device 20 of the above-mentioned embodiment, the PN code string for inversion spread having the same pattern as the PN code string which spectrally spread the SS anti-duplication control signal superimposed on the video signal is generated at the same timing as that for spectral spread with respect to the video signal, and spectral inversion spread is performed using this PN code string, thereby the anti-duplication control signal superimposed on the video signal is extracted.

In the case that the spectrally spread anti-duplication control signal is superimposed on the video signal recorded in the recording medium, as long as the recording device side has a function to spectrally spread and extract the anti-duplication control signal, the anti-duplication control signal superimposed previously on the video signal is extracted and thus the duplication control is performed effectively.

The method, in which the output device is provided with a generation section for generating the anti-duplication control signal and the anti-duplication control signal generated in the output device is spectrally spread using the PN code string and then superimposed on the video signal, may be used.

In this case, if the anti-duplication control signal is not recorded originally in a recording medium or if the spectrally spread anti-duplication control signal is not superimposed, the anti-duplication control signal is generated in the output device, and the duplication control is performed in the recording device side using the anti-duplication control signal to be superimposed on the video signal.

In the above-mentioned embodiments, the case that the output device and recording device of DVD devices are used as a duplication prevention control device is described, however, the present invention is by no means limited to the case. For example, the present invention can be applied to the case that the invention is applied to an output device of a broadcast station side for outputting television signals, and television signals to be transmitted on which the spectrally spread anti-duplication control signal is superimposed is transmitted. In the reception side, the television signal is subjected to inversion spectral spread to extract the anti-duplication control signal superimposed on the video signal, and the duplication prevention control of the video signal is performed based on this anti-duplication control signal.

Of course, the present invention can be applied to the output device and reception device of the video signal in the case that the video signal is transmitted/received through a cable such as cable television.

In the above-mentioned embodiment, the anti-duplication control signal is superimposed as an additional information, however, the additional information to be superimposed on the video signal is not limited to an anti-duplication control signal.

For example, a copyright information which allows us to identify the copyright holder of the picture to be played back from the video signal may be superimposed on the video signal. In this case, because the copyright holder is recognized by performing inversion spectral spread of the copyright information superimposed on the video signal and by extracting the copyright information, this method is useful for prevention of piracy, and the piracy is noticed easily in the case that the picture the copyright of which is held by the copyright holder is used without previous consent.

As described herein above, the copyright information can not removed or deteriorated even if the anti-duplication control signal is subjected to noise removal utilizing the correlation of the video signal, thinning out or interpolation of pixels in the horizontal direction formed by the video signal, or thinning out or interpolation between fields in the time axis direction, and thus the anti-duplication control signal is extracted and used consistently.

Effect

As described hereinbefore, according to the video signal transmission method, superimposed information extraction method, video signal output device, video signal reception device, video signal recording medium in accordance with the present invention, the additional information having the same data in the horizontal direction and time axis direction is superimposed repeatedly. Thereby, the spectrally spread additional information superimposed on the video signal will not be removed or deteriorated even if the additional information is subjected to noise removal utilizing correlation of the video signal.

The spectrally spread additional information superimposed on the video signal will not be changed even if the video signal is changed when the video signal is subjected to thinning out or interpolation in the horizontal direction or thinning out or interpolation in the time axis direction.

Hence, the spectrally spread additional information superimposed on the video signal is transmitted consistently, and in the reception side, the spectrally spread additional information superimposed on the received video signal is detected consistently.

Further, according to the present invention, because a plurality of different PN code strings is generated respectively in the horizontal direction, vertical direction, or time axis direction and different data are superimposed as the additional information, thus the quantity of additional information to be superimposed can be increased.

What is claimed is:

1. A video signal transmission method for transmitting a video signal on which a spectrally spread additional information is superimposed, said video signal transmission method comprising:

a spread code generation step for generating a spread code string containing a plurality of chips in 1 horizontal interval or in 1 vertical interval at a generation start timing having a period of an integer number of vertical periods synchronously with a vertical sync signal;

a spread code repetition step for repeating said spread code string generated in said spread code generation step over a repetition interval of a plurality of horizontal intervals or a plurality of vertical intervals so that chips having a same data are arranged in a vertical direction or a spatial direction of a time axis direction in a picture unit;

a spectral spread step for spectrally spreading an additional information and generating spectral spread additional information so that the same data is in at least one interval in said plurality of horizontal intervals or plurality of vertical intervals in said repetition interval using said spread code string generated in said spread code repetition step; and a superimposition step for superimposing said spectral spread additional information generated in said spectral step on said video signal.

2. A video signal transmission method as claimed in claim 1, wherein said additional information is an anti-duplication control information for performing duplication prevention control on said video signal on which said spectral spread additional information is superimposed.

3. A superimposed information extraction method for extracting spectrally spread additional information superimposed on a video signal from said video signal, comprising:

an inversion spread code generation step for generating a spread code string for inversion spread containing a plurality of chips in 1 horizontal interval or in 1 vertical interval at a generation start timing having a period of an integer number of vertical periods synchronously with a vertical sync signal;

an inversion spread code repetition step for repeating said spread code string generated in said inversion spread code generation step over a plurality of horizontal intervals or a plurality of vertical intervals so that chips having a same data are arranged in a vertical direction or a spatial direction of a time axis direction in a picture unit; and a spectral inversion spread step for inversely spreading said spectrally spread additional information superimposed on said video signal to extract additional information using said spread code string for inversion spread generated in said inversion spread code generation step and repeated in said inversion spread code repetition step.

4. A superimposed information extraction method as claimed in claim 3, wherein said additional information is an anti-duplication control information for performing duplication prevention control on said video signal on which said spectrally spread additional information is superimposed.

5. A video signal output device comprising:

spread code generation means for generating a spread code for spectral spread;

spread code generation control means for controlling said spread code generation means so as to generate a spread code string containing a plurality of chips in one of 1 horizontal interval and 1 vertical interval at a generation start timing having a period of an integer number of vertical periods synchronously with a vertical sync signal;

spread code repetition means for receiving said spread code string in said one of 1 horizontal interval and 1 vertical interval from said spread code generations means, and for repeating said received spread code string over a repetition interval of a plurality of horizontal intervals or plurality of vertical intervals so that chips having a same data are arranged in a vertical direction or a spatial direction of a time axis direction in a picture unit under a control of said spread code generation control means;

spectral spread means for spectrally spreading an additional information and generating spectral spread additional information so that the same data is in at least one interval of said plurality of horizontal intervals or vertical intervals in said repetition interval using said spread code string supplied from said spread code repetition means; and superimposition means for superimposing said spectral spread additional information supplied from said spectral spread means on said video signal.

6. A video signal output device as claimed in claim 5, wherein said additional information spectrally spread by said spectral spread means is an anti-duplication control information for performing duplication prevention control on said video signal on which said spectral spread additional information is superimposed.

7. A video signal reception device for receiving a video signal on which spectrally spread additional information is superimposed, comprising:

spread code generation means for generating a spread code for inversion spectral spread;

inversion spread code generation control means for controlling said spread code generation means so as to generate a spread code string for inversion spectral spread containing a plurality of chips in one of 1 horizontal interval and 1 vertical interval at a generation start timing having a period of an integer number of vertical periods synchronously with a vertical sync signal inversion spread code repetition means for repeating said spread code string over a plurality of horizontal intervals or plurality of vertical intervals so that chips having a same data are arranged in a vertical directions or a spatial direction of a time axis direction in a picture unit; and spectral inversion spread means for inversely spreading said spectrally spread additional information superimposed on said video signal to extract original additional information using said inversion spread code string for inversion spread generated by said inversion spread code generation means and repeated by said inversion spread repetition means.

8. A video signal reception device as claimed in claim 7, wherein said original additional information is an anti-duplication control information for said video signal on which said spectrally spread additional information is superimposed, and said video signal reception device further comprises duplication control means for performing duplication prevention control on said received video signal correspondingly to said original additional information extracted by said spectral inversion spread means.

9. A video signal transmission method for transmitting a video signal on which spectrally spread additional information is superimposed, said video signal transmission method comprising:

a spread code generation step for generating a plurality of spread code strings which contains an integer number of chips per interval in one of 1 horizontal interval and 1 vertical interval and in which chips having a same data are arranged in a vertical direction or a spatial direction of a time axis direction in a picture unit in a continuous plurality of horizontal intervals or plurality of vertical interval at a generation start timing of a period of one of 1 horizontal period and an integer number of vertical periods synchronously with a video sync signal;

a spread code switching step for switching said plurality of spread code strings in a horizontal direction, said vertical direction, or said spatial direction;

a spectral spread step for spectrally spreading additional information having a same content for at least a same series of spread code strings using said plurality of spread code strings switched in said spread code switching step, and for generating spectral spread additional information thereby; and a superimposition step for superimposing said spectral spread additional information generated in said spectral spread step on said video signal.

10. A video signal transmission method as claimed in claim 9, wherein said additional information is an anti-duplication control information for performing duplication prevention control on said video signal on which said spectral spread additional information is superimposed.

11. A superimposed information extraction method for extracting spectrally spread additional information superimposed a video signal from said video signal, comprising:

a spread code generation step for generating a plurality of spread code strings for inversion spread which contains an integer number of chips per interval in one of 1 horizontal interval and 1 vertical interval and in which chips having a same data are arranged in a vertical direction or a spatial direction of a time axis direction in a picture unit in a continuous plurality of horizontal intervals or plurality of vertical intervals at a generation start timing of a period of 1 horizontal period or an integer number of vertical periods synchronously with a video sync signal;

a spread code switching step for switching said plurality of spread code strings in a horizontal direction, said vertical direction, or said spatial direction; and a spectral inversion spread step for inversely spreading said spectrally spread additional information superimposed on said video signal and extracting original additional information thereby, using said plurality of spread code strings switched in said spread code switching step.

12. A superimposed information extraction method as claimed in claim 11, wherein said original additional information is an anti-duplication control information for performing duplication prevention control on said video signal on which said spectrally spread additional information is superimposed.

13. A video signal output device comprising:

spread code generation means for generating a plurality of spread codes of different series for spectral spread;

spread code generation control means for controlling said spread code generation means to generate a plurality of spread code strings which contains an integer number of chips in one of 1 horizontal interval and 1 vertical interval and in which chips having a same data are arranged in a vertical direction or a spatial direction of a time axis direction in a picture unit in a continuous plurality of horizontal intervals or plurality of vertical intervals at a generation start timing of a period of 1 horizontal period or an integer number of vertical periods synchronously with a video sync signal, and for generating a switching control signal;

spread code switching means for switching said plurality of spread code strings generated by said plurality of spread code generation means under control of said spread code generation control means in a horizontal direction, said vertical direction, or said spatial direction correspondingly to said switching control signal supplied from said spread code generation control means;

spectral spread means for spectrally spreading additional information data having a same content for at least a same series of spread code strings, using said plurality of spread code strings switched by said spread code switching means, and generating spectrally spread additional information thereby; and superimposition means for superimposing said spectral spread additional information generated by said spectral spread means on said video signal.

14. A video signal output device as claimed in claim 13, wherein said additional information spectrally spread by said spectral means is an anti-duplication control information for performing duplication prevention control on said video signal on which said spectrally spread additional information is superimposed.

15. A reception device for receiving a video signal on which a spectrally spread additional information is superimposed, comprising:

spread code generation means for generating a plurality of spread codes of different series for spectral spread;

spread code generation control means for controlling said spread code generation means to generate a plurality of spread code strings which contains an integer number of chips per interval in 1 horizontal interval or in 1 vertical interval and in which chips having a same data are arranged in a vertical direction or a spatial direction of a time axis direction in a picture unit in a continuous plurality of horizontal intervals or plurality of vertical intervals at a generation start timing of a period of 1 horizontal period or an integer of vertical periods synchronously with a video sync signal;

spread code switching means for switching said plurality of spread code strings in a horizontal direction, said vertical direction, or said spatial direction; and spectral inversion spread means for inversely spreading said spectrally spread additional information superimposed on said video signal and extracting original additional information thereby, using a spread code string switched by said spread code switching means.

16. A video signal reception device as claimed in claim 15, wherein said original additional information is an anti-duplication control information for said video signal on which said spectrally spread additional information is superimposed, and said video signal reception device further comprises duplication control means for performing duplication prevention control on said received video signal.

17. A video signal transmission/reception system comprising a video signal output device for outputting a spectrally spread additional information superimposed on a video signal and a video signal reception device for receiving said video signal output from said video signal output device, said video signal output device including:

spread code generation means for generating a spread code for spectral spread, spread code generation control means for controlling said spread code generation means so as to generate a spread code string containing a plurality of chips in one of 1 horizontal interval and 1 vertical interval at a generation start timing having a period of an integer number of vertical periods synchronously with a vertical sync signal, spread code repetition means for receiving said spread code string in said one of 1 horizontal interval and 1 vertical interval from said spread code generation means, and for repeating said received spread code string over a repetition interval of a plurality of horizontal intervals or plurality of vertical intervals so that chips having a same data are arranged in a vertical direction or a spatial direction of a time axis direction in a picture unit under a control of said spread code generation control means, spectral spread means for spectrally spreading an additional information so that a same data is contained at least in each of said 1 horizontal interval or 1 vertical interval in said repetition interval using said spread code string supplied from said spread code repetition means, and superimposition means for superimposing said spectral spread additional information supplied from said spectral spread means on said video signal; and said video signal reception device including:

inversion spread code generation means for generating an inversion spread code for inversion spectral spread, inversion spread code generation control means for controlling said inversion spread code generation means so as to generate an inversion spread code string for inversion spread containing a plurality of chips in one of 1 horizontal interval and 1 vertical interval at a generation start timing having a period of an integer number of vertical periods synchronously with the vertical sync signal, inversion spread code repetition means for repeating said inversion spread code string generated in said inversion spread code generation means over a plurality of horizontal intervals or plurality of vertical intervals so that chips having a same data are arranged in the vertical direction or the spatial direction of the time axis direction in a picture unit, and inversion spectral spread means for inversely spreading said spectrally spread additional information superimposed on said video signal to extract said additional information using said inversion spread code string for inversion spread generated by said inversion spread code generation mean and repeated by said inversion spread code repetition means.

18. A video signal transmission/reception system as claimed in claim 17, wherein said additional information is an anti-duplication control information for performing duplication prevention control on said video signal on which said spectrally spread additional information is superimposed, and said video signal reception device further comprises duplication control means for performing duplication prevention control on said received video signal correspondingly to said additional information extracted by said inversion spectral spread means.

19. A video signal transmission/reception system comprising a video signal output device for outputting a spectrally spread additional information superimposed on a video signal and a video signal reception device for receiving said video signal output from said video signal output device, said video signal output device comprising:

spread code generation means for generating a plurality of spread codes of different series for spectral spread, spread code generation control means for controlling said spread code generation means to generate a plurality of spread code strings which contains an integer number of chips in one of 1 horizontal interval and 1 vertical interval and in which chips having a same data are arranged in a vertical direction or a spatial direction of a time axis direction in a picture unit in a continuous plurality of horizontal intervals or plurality of vertical intervals at a generation start timing of a period of 1 horizontal period or an integer number of vertical periods synchronously with a video sync signal, and for generating a switching control signal, spread code switching means for switching said plurality of spread code strings generated by said spread code generation means under control of said spread code generation control means in a horizontal direction, said vertical direction, or said spatial direction correspondingly to said switching control signal supplied from said spread code generation control means, spectral spread means for spectrally spreading additional information having a same content for at least a same series of spread code strings using said plurality of spread code strings switched by said spread code switching means, and superimposition means for superimposing spectral spread additional information generated by said spectral spread means on said video signal, and said video signal reception device being comprising:

inversion spread code generation means for generating a plurality of inversion spread codes of different series for inversion spectral spread, spread code generation control means for controlling said inversion spread code generation means to generate a plurality of inversion spread code strings which contains an integer number of chips in one of 1 horizontal interval and 1 vertical interval and in which chips having a same data are arranged in the vertical direction or the spatial direction of the time axis direction in a picture unit a continuous plurality of horizontal intervals or plurality of vertical intervals at a generation start timing of a period of 1 horizontal period or an integer number of vertical periods synchronously with the video sync signal, spread code switching means for switching said plurality of spread code strings in the horizontal direction, the vertical direction, or said spatial direction, and spectral inversion spread means for inversely spreading said spectrally spread additional information superimposed on said video signal and extracting said additional information, using a spread code string switched by said spread code switching means.

20. A video signal transmission/reception system as claimed in claim 19, wherein said additional information is an anti-duplication control information for performing duplication prevention control on said video signal on which said spectrally spread additional information is superimposed, and said video signal reception device further comprises duplication control means for performing duplication prevention control on said received video signal correspondingly to said additional information extracted by said inversion spectral spread means.

21. A video signal recording medium containing video signals recorded therein on which spectrally spread additional information is superimposed, said spectrally spread additional information being additional information spectrally spread using a spread code having a period of an integer number of vertical intervals with reference to a video sync signal, and said spectrally spread additional information being superimposed on the video signal so that chips having a same data are arranged in one of a prescribed plurality of pixel, prescribed plurality of horizontal intervals, and prescribed plurality of vertical intervals.

22. A video signal transmission method for transmitting video information, comprising:

dividing a video information of 1 picture horizontally and vertically into a plurality of rectangular block units;

compression coding processing each block unit for transmission; and spectrally spreading an additional information so that 1 chip is allocated to an integer number of block units, and superimposed on said video signal.

23. A video signal transmission method as claimed in claim 22, further comprising:

a spread code generation step for generating a spread code string containing a plurality of chips corresponding to a first number of blocks in a horizontal direction in 1 horizontal interval at a generation start timing of 1 vertical period synchronously with a vertical sync signal, a spread code repetition step for repeating said spread code string in 1 horizontal interval unit generated in said spread code generation step over a repetition interval of a plurality of horizontal intervals corresponding to a second number of blocks in a vertical direction so that chips having a same data are arranged in the vertical direction, a spectral spread step for spectrally spreading said additional information using said spread code string generated in said spread code generation step and repeated in said spread code repetition step so that spectral spread additional information has a same data at least in said repetition interval of a plurality of horizontal intervals, and a superimposition step for superimposing said spectral spread additional information generated in said spectral spread step on said video signal.

* * * * *